(12) United States Patent
Chakankar et al.

(10) Patent No.: US 11,232,067 B2
(45) Date of Patent: *Jan. 25, 2022

(54) USING A SECONDARY STORAGE SYSTEM TO MAINTAIN FUNCTIONALITY OF A DATABASE DURING DATABASE MIGRATION

(71) Applicant: Cohesity, Inc., San Jose, CA (US)

(72) Inventors: Abhijit Chakankar, San Jose, CA (US); Manoj Singhal, Sunnyvale, CA (US); Warren Shen, Sunnyvale, CA (US); Sashikanth Madduri, Mountain View, CA (US); Rupesh Bajaj, Dewas (IN); Vivek Velankar, Bangalore (IN); Sandeep Tandekar, Bangalore (IN); Sunil Moolchandani, Santa Clara, CA (US); Apollo Aguilan Tanting, Millbrae, CA (US); Aditya Tandon, San Francisco, CA (US)

(73) Assignee: Cohesity, Inc., San Jose, CA (US)

( * ) Notice: Subject to any disclaimer, the term of this patent is extended or adjusted under 35 U.S.C. 154(b) by 26 days.

This patent is subject to a terminal disclaimer.

(21) Appl. No.: 16/831,543

(22) Filed: Mar. 26, 2020

(65) Prior Publication Data

US 2020/0285608 A1 Sep. 10, 2020

Related U.S. Application Data

(63) Continuation of application No. 16/255,643, filed on Jan. 23, 2019, now Pat. No. 10,649,952.

(51) Int. Cl.
*G06F 16/11* (2019.01)
*G06F 16/18* (2019.01)
(Continued)

(52) U.S. Cl.
CPC ............ *G06F 16/119* (2019.01); *G06F 3/067* (2013.01); *G06F 3/0617* (2013.01);
(Continued)

(58) Field of Classification Search
CPC .. G06F 16/119; G06F 16/1873; G06F 16/213; G06F 3/0617; G06F 3/0647;
(Continued)

(56) References Cited

U.S. PATENT DOCUMENTS 9,696,913 B1 7/2017 Mohit
10,152,387 B1 12/2018 Anupam
(Continued)

*Primary Examiner* — James E Richardson
(74) *Attorney, Agent, or Firm* — Van Pelt, Yi & James LLP

(57) ABSTRACT

A request to migrate from a secondary storage system to a server a requested version of database content of a database backed up at the secondary storage system is received. A new version of the database content at the secondary storage system is instantiated. Functionality of the database is maintained including by allowing a database application hosted on the server to access the database content from the secondary storage system using the instantiated new version of the database content while migrating the requested version of database content from the secondary storage system to the server.

20 Claims, 20 Drawing Sheets

(51) Int. Cl.
  *G06F 16/21* (2019.01)
  *G06F 3/06* (2006.01)

(52) U.S. Cl.
  CPC ........ *G06F 3/0647* (2013.01); *G06F 16/1873* (2019.01); *G06F 16/214* (2019.01)

(58) Field of Classification Search
  CPC ........ G06F 3/065; G06F 3/067; G06F 3/0671; G06F 16/214
  See application file for complete search history.

(56) References Cited

U.S. PATENT DOCUMENTS

| | | | |
|---|---|---|---|
| 2003/0177324 A1 | 9/2003 | Timpanaro-Perrotta | |
| 2005/0065985 A1 | 3/2005 | Himabindu | |
| 2013/0031403 A1 | 1/2013 | Mordani | |
| 2013/0346713 A1 | 12/2013 | Beeken | |
| 2014/0372353 A1 | 12/2014 | Yamamoto | |
| 2015/0149416 A1* | 5/2015 | Dhavale | G06F 16/2308 707/687 |
| 2015/0370502 A1 | 12/2015 | Aron | |
| 2016/0034481 A1* | 2/2016 | Kumarasamy | G06F 16/128 707/639 |
| 2017/0083250 A1 | 3/2017 | Beeken | |
| 2017/0371696 A1* | 12/2017 | Prziborowski | G06F 9/45558 |
| 2018/0074748 A1 | 3/2018 | Makin | |
| 2018/0373708 A1* | 12/2018 | Martin | G06F 16/2282 |
| 2019/0065322 A1 | 2/2019 | Chakankar | |
| 2019/0265995 A1* | 8/2019 | Franciosi | G06F 9/45558 |

* cited by examiner

USING A SECONDARY STORAGE SYSTEM TO MAINTAIN FUNCTIONALITY OF A DATABASE DURING DATABASE MIGRATION

CROSS REFERENCE TO OTHER APPLICATIONS

This application is a continuation of co-pending U.S. patent application Ser. No. 16/255,643, entitled USING A SECONDARY STORAGE SYSTEM TO MAINTAIN FUNCTIONALITY OF A DATABASE DURING DATABASE MIGRATION filed Jan. 23, 2019 which is incorporated herein by reference for all purposes.

BACKGROUND OF THE INVENTION

A database may be associated with one or more files, such as a primary database file, a log file, a tablespace, a schema, a datafile, a control file, etc. The one or more files associated with the database may occupy a large amount of storage (e.g., 10 TB). The one or more files associated with the database may be migrated to a second server. It may take a long period of time (e.g., 10 hours) to migrate the data associated with the one or more files. A database may be quiesced to prevent the one or more files associated with the database from being inconsistent with the one or more migrated files associated with the database, but such an amount of downtime associated with the database may be unacceptable and/or impractical for users associated with the database.

BRIEF DESCRIPTION OF THE DRAWINGS

Various embodiments of the invention are disclosed in the following detailed description and the accompanying drawings.

DETAILED DESCRIPTION

Figure 1A:
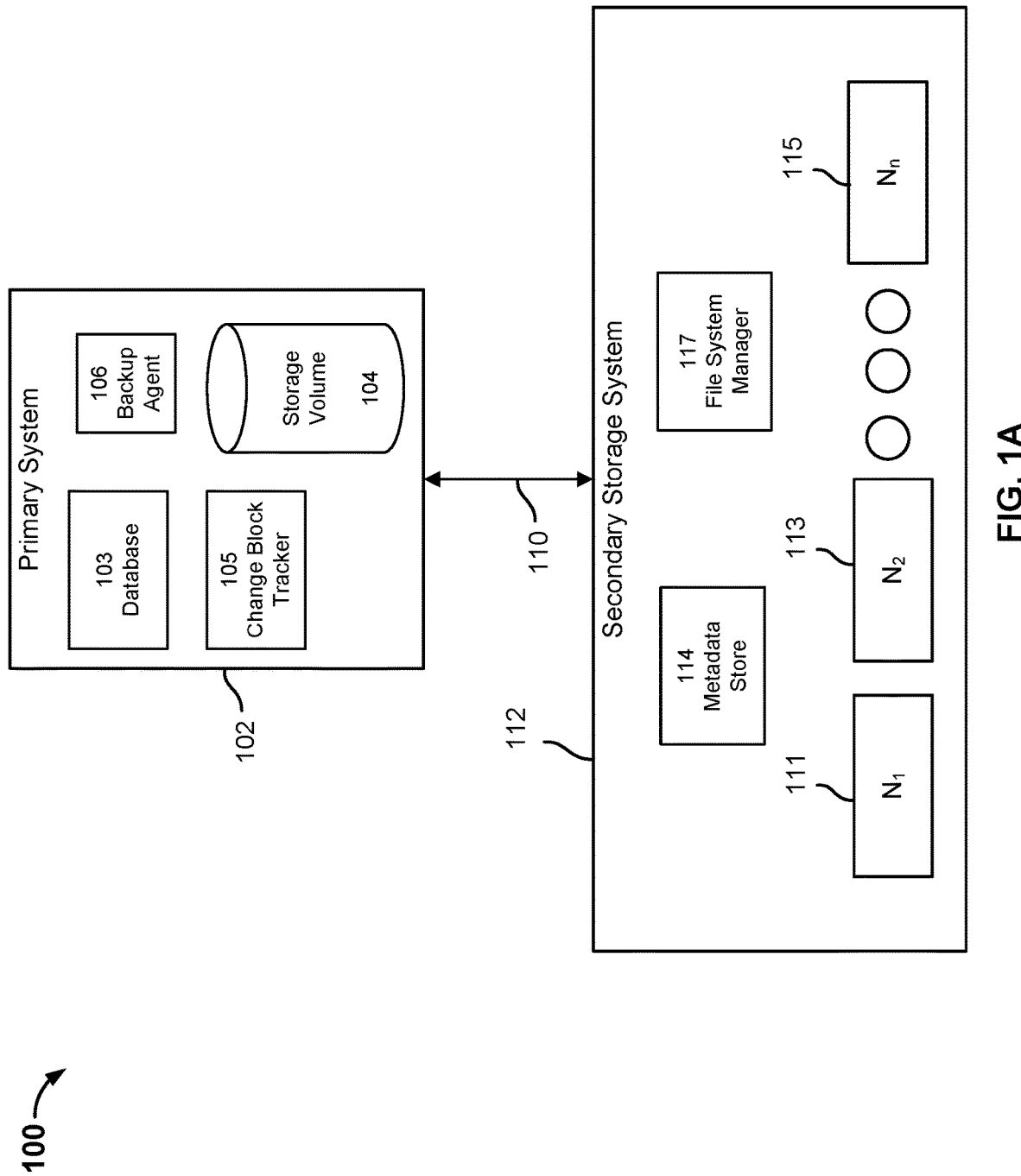
FIG. 1A is a block diagram illustrating an embodiment of a system for storing database content.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A primary system may include a database and store database content associated with the database. The database content may include one or more database files, such as a primary database file, a log file, a tablespace, a schema, a datafile, a control file, etc. A secondary storage system may cause the primary system to perform a backup snapshot and store the backup snapshot to the secondary storage system. A backup snapshot represents the state of the primary system at a particular point in time (e.g., the state of the file system data). The backup snapshot may include data of the one or more database files. The backup snapshot may be a full backup snapshot or an incremental backup snapshot. A full backup snapshot stores the entire state of the primary system at the particular point in time and includes all of the data associated with the one or more database files. An incremental backup snapshot includes the data associated with the primary system that was not backed up in a previous backup snapshot and may include the data associated with the one or more database files that was not backed up in a previous backup snapshot.

A secondary storage system may ingest and store the file system data of the backup snapshot. A file system manager of the secondary storage system may organize the file system data of the backup snapshot using a tree data structure. An example of the tree data structure is a snapshot tree (e.g., Cohesity Snaptree), which may be based on a B+ tree structure (or other type of tree structure in other embodiments). The tree data structure provides a view of the file system data corresponding to a backup snapshot. The view of the file system data corresponding to the backup snapshot may be comprised of a file system metadata snapshot tree and one or more file metadata trees. A file metadata tree is a snapshot structure that stores the metadata associated with a file and may correspond to one of the files included in the backup snapshot. For example, a file metadata tree may correspond to one of the database files.

A file system metadata snapshot tree is a representation of a fully hydrated backup because it provides a complete view of the primary system at a particular moment in time. A fully hydrated backup is a backup that is ready for use without having to reconstruct a plurality of backups to use it. Conventional systems may reconstruct a backup by starting with a full backup and applying one or more changes associated with one or more incremental backups to the data associated with the full backup. In contrast, any file stored on the primary system at a particular time and the file's contents, for which there is an associated backup snapshot, may be determined from the file system metadata snapshot tree, regardless if the backup snapshot associated with the file system metadata snapshot tree was a full backup snapshot or an incremental backup snapshot. Creating an incremental backup snapshot of a primary system may include only copying data of the primary system that was not previously backed up. However, a file system metadata snapshot tree corresponding to an incremental backup snapshot provides a complete view of the primary system at the particular moment in time because it includes references to data of the primary system that was previously stored. For example, a root node associated with the file system metadata snapshot tree may include one or more references to nodes associated with one or more previous backup snapshots and one or more references to nodes associated with the current backup snapshot. This provides significant savings in the amount of time needed to restore, recover, or replicate a database file. In contrast, traditional recovery/restoration methods may require significant time, storage, and computational resources to reconstruct a particular version of a database file from a full backup and a series of incremental backups.

Database content comprising one or more database files may be migrated to a server that is different from the primary system for one or more reasons. In some embodiments, a user may desire to use production quality data for testing/development purposes. The secondary storage system may be used to migrate the database content instead of the primary system hosting the database to free up system resources of the primary system for other purposes, such as to respond to one or more database requests. In other embodiments, the primary system that includes the database may go offline and the database content may be migrated to a second server. The secondary storage system may be used to migrate the database content instead of the primary system hosting the database because the primary system is offline and unable to migrate the database content.

One problem with migrating database content to the second server is the amount of downtime associated with the migration. The one or more database files may be quite large (e.g., 10 TBs) and migrating such large files may require a long period of time to perform (e.g., 10 hours). The migrated database content stored on the second server should be consistent with the database content stored at the secondary storage system before a user associated with the second server has access to the data. However, the user associated the second server may desire to have instant access to the database content.

Instantaneous or near-instantaneous access to the database content stored on the secondary storage system may be provided by instantiating a new version of the database content. Instantiating the new version of the database content may include cloning a view corresponding to a backup snapshot that includes a version of the desired database content. A user with access to the data associated with a view corresponding to a backup snapshot may have read/write privileges. The view corresponding to the backup snapshot that includes the version of the desired database content is cloned to prevent the user associated with the second server from modifying the backup snapshot that represents the state of the primary system at a particular moment in time. The database application on the second server may be quiesced for a brief period of time while the view corresponding to the backup snapshot is being cloned. This is to prevent the view corresponding to the backup snapshot and the cloned view of the view corresponding to the backup snapshot from being inconsistent with each other. The cloned view is a fully hydrated backup and includes access to the database content. Instantiating the new version of the database content may also include mounting the database content associated with the cloned view. Functionality of the database may be maintained by providing the second server with access to the mounted database and allowing the second server to modify the data included in the mounted database as if the data was stored locally on the second server. For example, one or more masking techniques may be applied to the data included in the mounted database to obscure an identity associated with the data. Mounting the database and providing remote access may provide the user associated with the second server instantaneous or near-instantaneous access to the database content stored on the secondary storage system.

The second server may include an instance of a database application. A user associated with the second server may use the database application to make one or more database requests (read/write) to the mounted database. However, the input/output operations per second (IOPS) associated with such remote access may be sufficient in the short term, but unacceptable as a long term solution. For example, the IOPS associated with remote access may be between 10-15 milliseconds (ms). In contrast, the IOPS associated with local access may be around 1 ms. The one or more database calls may take longer to perform than if the data associated with the one or more database files was locally stored on the second server. However, it may take a long period of time (e.g., 10 hours) to migrate the data associated with the one or more database files. The data included in the mounted database may be migrated in the background (e.g., live migration) from the secondary storage system to the second server while a user associated with the second server has access to the mounted database.

In some embodiments, a portion of the database content is migrated in the background from the secondary storage system to the second server while a user associated with the second server is accessing the instantiated version of the database content (e.g., the mounted database). For example, the user associated with the second server may only need access to a subset of the database content. The user associated with the second server may need access to a particular version of the tablespace or a particular version of the schema. The one or more files associated with the particular version of the tablespace or the particular version of the schema, instead of the entire database, may be migrated from the secondary storage system to the second server. A user associated with the second server may experience an earlier improved IOPS performance because only a portion of the database content is being migrated instead of waiting for the entire database content to be migrated in order to experience an improved TOPS performance. The one or more files included in the subset of the database content may be migrated based on a corresponding priority associated with the one or more files. The priority associated with the one or more files may be based on a migration policy. For example, a migration policy may indicate that a frequently used file (e.g., accessed more than a threshold number of times within a threshold period) may be migrated at the outset and one or more files that are not frequently used (e.g., access less than a threshold number of times within a threshold period) may be migrated after one or more files with a higher priority are migrated.

In other embodiments, the entire database content is migrated in the background from the secondary storage system to the second server while a user associated with the second server is accessing the mounted database. After the initial migration instance of the database content is completed, the data included in the mounted database may be inconsistent with the database content stored on the second server because the user associated with the second server has made one or more modifications to the data included in the mounted database. The cloned view associated with the mounted database may be traversed to identify the data that was added or modified to the mounted database during the initial migration instance. The secondary storage system may determine the amount of time needed to migrate the identified data. The amount of time needed to migrate the identified data is compared to a downtime threshold. In some embodiments, the amount of time needed to migrate the identified data is less than the downtime threshold (e.g., 30 seconds), the database application hosted on the second server is quiesced and the identified data is migrated to the second server. In other embodiments, the amount of time needed to migrate the identified data is not less than the downtime threshold, a view associated with the mounted database is cloned, and the identified data is migrated in the background while the user associated with the second server continues to access and use the mounted database.

Each time a data migration instance is completed, the data included in the mounted database may be inconsistent with the database content stored on the second server. An amount of time needed to migrate data to make the data included in the mounted database consistent with the database content stored on the second server may be determined. The process described above may be repeated until the amount of time needed to migrate the data to make the data included in the mounted database consistent with the database content stored on the second server is less than the downtime threshold. The amount of time needed to migrate data to make the data included in the mounted database consistent with the database content stored on the second server may reduce each time a data migration is completed. At some point in time, the amount of time needed to migrate the data to make the data included in the mounted database consistent with the database content stored on the second server is less than a downtime threshold. In the event the amount of time needed to migrate the data to make the data included in the mounted database consistent with the database content stored on the second server is less than the downtime threshold, the database application hosted on the second server is quiesced and the data to make the data included in the mounted database consistent with the database content stored on the second server is migrated to the second server.

Regardless of whether a partial or full database migration is performed, the user associated with the second server is provided with instantaneous or near-instantaneous access to the data associated with a database without a significant amount of downtime. In addition to reducing the amount of downtime, the IOPS performance is improved over time as database content is migrated in the background from the secondary storage system to the second server while the user associated with the second server is accessing the mounted database. Once the database migration is completed, the database application hosted on the second server may locally access the database data without having to access the mounted database hosted on the secondary storage system.

FIG. 1A is a block diagram illustrating an embodiment of a system for storing database content. In the example shown, system 100 includes primary system 102 and secondary storage system 112.

Primary system 102 is a computing system comprised of one or more servers, one or more computing devices, one or more storage devices, and/or a combination thereof. Primary system 102 is comprised of database 103, storage volume 104, change block tracker 105, and backup agent 106. Primary system 102 may be a database server.

Database 103 may be a computer program that is configured to enter and retrieve information from a computerized database. Examples of database 103 include, but are not limited to, SQL Server, Oracle Database, Sybase, Informix, MySQL, etc. Database 103 may be associated with database content comprising one or more database files. For example, the one or more database files may include a primary database file, a log file, a tablespace, a datafile, a control file, etc.

The one or more database files may be stored in storage volume 104. Storage volume 104 may be configured to store the file system data associated with primary system 102. The file system data may include the one or more database files, one or more non-database files, and metadata associated with storage volume 104.

Change block tracker 105 may be configured to maintain a map of the one or more changes to the file system data associated with primary system 102. For example, change block tracker 105 may maintain a map of the one or more changes to the one or more database files. Primary system 102 may be configured to perform a full backup snapshot or an incremental backup snapshot. A full backup snapshot includes all of the file system data stored in storage volume 104. An incremental backup snapshot includes all of the file system data that was not previously backed up. The incremental backup snapshot may include data associated with one or more database files that was not previously backed up. Change block tracker 105 may be used to identify the file system data and data associated with the one or more database files that was not previously backed up. The map associated with change block tracker 105 may be cleared after a backup snapshot is performed.

Backup agent 106 may cause primary system 102 to perform a backup snapshot and to send to secondary storage system 112 file system data stored in storage volume 104. The backup snapshot may be a full backup snapshot or an incremental backup snapshot. Backup agent 106 may receive from secondary storage system 112 a command to perform a backup snapshot.

Primary system 102 may be configured to backup file system data to secondary storage system 112 according to one or more backup snapshot policies. In some embodiments, a backup snapshot policy indicates that file system data is to be backed up on a periodic basis (e.g., hourly, daily, weekly, monthly, etc.). In other embodiments, a backup snapshot policy indicates that file system data is to be backed up when a threshold size of data has changed. In other embodiments, a backup snapshot policy indicates that file system data is to be backed up upon a command from a user associated with primary system 102. The backup snapshot policy may indicate when a full backup snapshot of primary system 102 is to be performed. The backup snapshot policy may indicate when an incremental backup snapshot of primary system 102 is to be performed.

Primary system 102 is coupled to secondary storage system 112 via network connection 110. Network connection 110 may be a wired connection or a wireless connection.

Secondary storage system 112 is a storage system configured to ingest and store file system data received from primary system 102 via connection 110. Secondary storage system 112 may be comprised of one or more storage nodes 111, 113, 115. Each storage node may have its own corresponding processor. The one or more storage nodes may be one or more solid state drives, one or more hard disk drives, or a combination thereof. The file system data included in a backup snapshot may be stored in one or more of the storage nodes 111, 113, 115. In one embodiment, secondary storage system 112 is comprised of one solid state drive and three hard disk drives.

Secondary storage system 112 may include file system manager 117. File system manager 117 is configured to organize in a tree data structure the file system data received in a backup snapshot from primary system 102. An example of the tree data structure is a snapshot tree (e.g., Cohesity Snaptree), which may be based on a B+ tree structure (or other type of tree structure in other embodiments). The tree data structure provides a view of the file system data corresponding to a backup snapshot. The view of the file system data corresponding to the backup snapshot may be comprised of a file system metadata snapshot tree and a plurality of file metadata trees. A file metadata tree may correspond to one of the files included in the backup snapshot. The file metadata tree is a snapshot structure that stores the metadata associated with the file. For example, a file metadata tree may correspond to a database file. File system manager 117 may be configured to perform one or more modifications, as disclosed herein, to a file system metadata snapshot tree and a file metadata tree. The file system metadata snapshot tree and file metadata trees may be stored in metadata store 114. Metadata store 114 may store the view of file system data corresponding to a backup snapshot. Metadata store 114 may also store data associated with content files that are smaller than a limit size.

The tree data structure may be used to capture different versions of backup snapshots. The tree data structure allows a chain of file system metadata snapshot trees corresponding to different versions of backup snapshots (i.e., different file system metadata snapshot tree versions) to be linked together by allowing a node of a later version of a file system metadata snapshot tree to reference a node of a previous version of a file system metadata snapshot tree (e.g., a "snapshot tree forest"). For example, a root node or an intermediate node of a second file system metadata snapshot tree corresponding to a second backup snapshot may reference an intermediate node or leaf node of a first file system metadata snapshot tree corresponding to a first backup snapshot.

A file system metadata snapshot tree includes a root node, one or more levels of one or more intermediate nodes associated with the root node, and one or more leaf nodes associated with an intermediate node of the lowest intermediate level. The root node of a file system metadata snapshot tree includes one or more pointers to one or more intermediate nodes. Each intermediate node includes one or more pointers to other nodes (e.g., a lower intermediate node or a leaf node). A leaf node may store file system metadata, data associated with a file that is less than a limit size, an identifier of a data brick, a pointer to a file metadata tree (e.g., Blob structure), or a pointer to a data chunk stored on the secondary storage system.

Data associated with a file that is smaller than or equal to a limit size (e.g., 256 kB) may be stored in a leaf node of the file system metadata snapshot tree. A leaf node may be an index node (inode). A file metadata tree may be generated for a file that is larger than the limit size. The file metadata tree is a snapshot structure and is configured to store the metadata associated with a version of a file. The file may correspond to a database file.

The file metadata tree includes a root node, one or more levels of one or more intermediate nodes associated with the root node, and one or more leaf nodes associated with an intermediate node of the lowest intermediate level. The tree data structure associated with a file metadata tree allows a chain of file metadata trees corresponding to different versions of a file to be linked together by allowing a node of a later version of a file metadata tree to reference a node of a previous version of a file metadata tree. For example, a root node or an intermediate node of a second file metadata tree corresponding to a second version of a database file may reference an intermediate node or leaf node of a first file metadata tree corresponding to a first version of the database file.

A leaf node of a file metadata tree may include an identifier of a data brick associated with one or more data chunks of the file or a pointer to the data brick associated with one or more data chunks of the file. For example, a file metadata tree may correspond to a database file and a leaf node of the file metadata tree may include a pointer to or an identifier of a data brick associated with one or more data chunks of the database file. A data brick may include one or more data chunks. In some embodiments, the size of a brick is 256 kB. The data brick may include one or more data chunks. The one or more data chunks may be of variable length within a particular range (e.g., 4 kB to 64 kB).

The location of the data brick may be identified using a data structure (e.g., list, table, etc.) stored in metadata store 114 that matches brick identifiers to a physical storage location or the location of the data brick may be identified based on the pointer to the data brick. In some embodiments, the data structure associates brick identifiers with chunk identifiers (e.g., hashes). The data structure or a different data structure may associate chunk identifiers with a brick offset. A chunk may be associated with a chunk table, which contains a corresponding chunk file ID. The chunk file ID is associated with a chunk file table, which indicates the location of the data (e.g., an offset in a data brick).

A chunk identifier (e.g., hash) may be computed for a data chunk. The chunk identifier may be compared to entries included in a data structure that stores chunk identifiers associated with data chunks stored by the secondary storage system. In the event the computed chunk identifier matches an entry of the data structure (e.g., hash dictionary), a reference to the previously stored chunk having the computed chunk identifier may be stored in the brick.

Figure 1B:
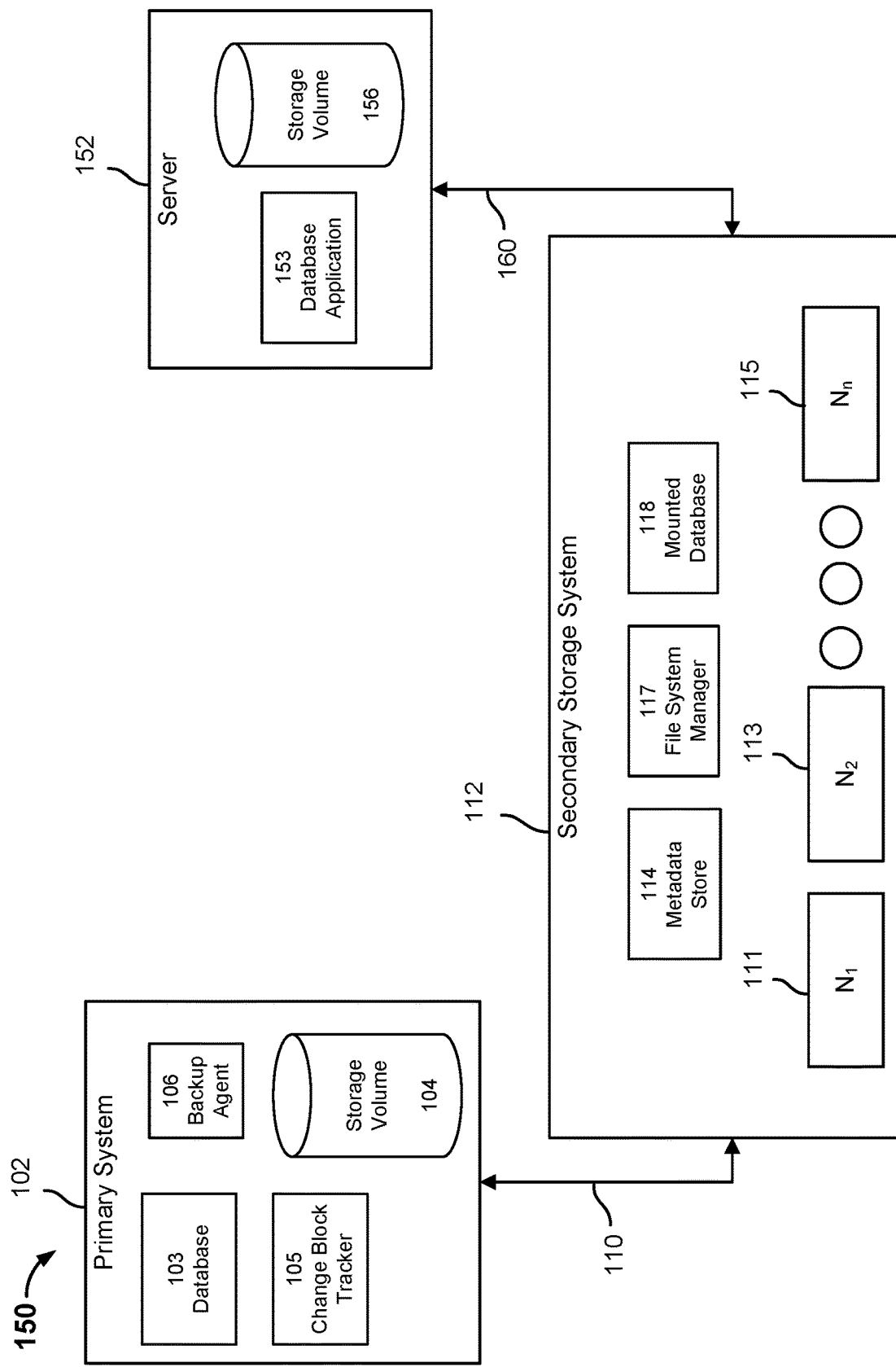
FIG. 1B is a block diagram illustrating an embodiment of a system for migrating database content.

FIG. 1B is a block diagram illustrating an embodiment of a system for migrating database content. In the example shown, system 150 includes primary system 102, secondary storage system 112, and server 152.

Server 152 is a computing system comprised of one or more servers, one or more computing devices, one or more storage devices, and/or a combination thereof. Server 152 may be comprised of database application 153 and storage volume 156. In other embodiments, database application 153 is external to server 152 and has access to secondary storage system via a network connection (not shown). Secondary storage system 112 is coupled to server 152 via network connection 160. Network connection 160 may be a wired connection or a wireless connection. In some embodiments, server 152 is part of secondary storage system 112.

Database content comprising one or more database files associated with database 103 may be migrated to server 152 for one or more reasons. In some embodiments, a user associated with database 103 may desire to use production quality data for testing/development purposes. Secondary storage system 112 may be used to migrate the database content instead of primary system 102 to free up system resources of primary system 102 for other purposes, such as to respond to one or more database requests. In other embodiments, primary system 102 may go offline and the one or more database applications files may be migrated to server 152 to reduce the amount of downtime associated with primary system 102 being offline. Secondary storage system 112 may be used to migrate the database content instead of primary system 102 because primary system 102 is offline and unable to migrate the database content.

One problem with migrating database content to server 152 is the amount of downtime associated with the migration. The one or more database files may be quite large (e.g., 10 TBs) and migrating such large files may require a long period of time to perform (e.g., 10 hours). The migrated database content stored on server 152 should be consistent with the database content stored at secondary storage system 112 before a user associated with server 152 has access to the data. However, the user associated with server 152 may desire to have instant access to the database content. Secondary storage system 112 may provide instantaneous or near-instantaneous access to the database content by cloning a view corresponding to a backup snapshot that includes a version of the desired database content. A user with access to the data associated with a view corresponding to a backup snapshot may have read/write privileges.

A new version of the database content stored at secondary storage system 112 may be instantiated. Instantiating the new version of the database content may include cloning the view corresponding to the backup snapshot that includes the version of the desired database content. The view corresponding to the backup snapshot that includes the version of the desired database content is cloned to prevent the user associated with server 152 from modifying the backup snapshot that represents the state of primary system 102 at a particular moment in time. Database application 153 may be quiesced for a brief period of time while the view corresponding to the backup snapshot is being cloned. This is to prevent the view corresponding to the backup snapshot and the cloned view of the view corresponding to the backup snapshot from being inconsistent with each other. The cloned view is a fully hydrated backup and includes access to the database content. Cloning a view corresponding to a backup snapshot includes copying a root node associated with the view corresponding to the backup snapshot. The root node copy includes the same set of pointers as the copied root node, but may include a different node identifier and a different view identifier. The cloned view has access to the same data as the view corresponding to the backup snapshot. In some embodiments, the database content associated with a cloned view is migrated without mounting the database.

Instantiating the new version of the database content may also include mounting the database content associated with the cloned view as mounted database 118. Mounted database 118 may include the data associated with one or more database files included in the view corresponding to the backup snapshot. Server 152 may be provided with remote access (e.g., read/write access) to mounted database 118 via network connection 160. Server 152 may be able to modify the data included in mounted database 152 as if the data was stored locally on server 152. For example, one or more masking techniques may be applied to the data included in mounted database 118 to obscure an identity associated with the data. Mounting the database and providing remote access may provide the user associated with server 152 instantaneous or near-instantaneous access to the database content stored on secondary storage system 112.

Server 152 may include an instance of a database application, e.g., database application 153. A user associated with server 152 may use database application 153 to make one or more database requests (read/write) to mounted database 118. However, the input/output operations per second (IOPS) associated with such remote access may be sufficient in the short term, but unacceptable as a long term solution. For example, the IOPS associated with remote access may be between 10-15 milliseconds (ms). In contrast, the IOPS associated with local access may be around 1 ms. The one or more database calls may take longer to perform than if the data associated with the one or more database files was locally stored on server 152. However, it may take a long period of time (e.g., 10 hours) to migrate the data associated with the one or more database files. The data included in mounted database 118 may be migrated in the background (e.g., live migration) from secondary storage system 112 to server 152 while a user associated with server 152 has access (e.g., read/write access) to mounted database 118. In some embodiments, the data associated with the cloned view is migrated from secondary storage system 112 to server 152. In other embodiments, the view corresponding to the modified data included in mounted database 118 is cloned and data included in the cloned view corresponding to the modified data included in mounted database 118 is migrated from secondary storage system 112 to server 152.

In some embodiments, a portion of the data included in mounted database 118 is migrated in the background from secondary storage system 112 to server 152 while a user associated with server 152 is accessing mounted database 118. For example, the user associated with server 152 may only need access to a subset of the database content included in mounted database 118. The user associated with server 152 may need access to a particular version of the tablespace or a particular version of the schema. The one or more files associated with the particular version of the tablespace and/or the particular version of the schema, instead of the entire database, may be migrated from secondary storage system 112 to the server 152. This may enable a user associated with server 152 to experience an earlier improved IOPS performance without having to wait for the entire period of time to migrate the database content because only a portion of the database content is being migrated. The user associated with server 152 may select the one or more database files included in the subset of database content to migrate. The user associated with server 152 may select a particular version of a tablespace and/or a particular version of a schema and secondary storage system 112 may determine the one or more database files associated with the selected version of the tablespace and/or the selected version of the schema. Database application 153 may keep track of one or more changes to the subset of database content while the subset of database content is being migrated from secondary storage system 112 to server 152 and database application 153 may apply the one or more tracked changes to the subset of database content after the subset of database content is migrated to server 152.

The one or more files included in the subset of the database content included in mounted database 118 may be migrated based on a corresponding priority associated with the one or more files. The priority associated with the one or more files may be based on a migration policy. The priority associated with the one or more files may be based on a migration policy. For example, a migration policy may indicate that a frequently used file (e.g., accessed more than a threshold number of times within a threshold period) may be migrated at the outset and one or more files that are not frequently used (e.g., access less than a threshold number of times within a threshold period) may be migrated after one or more files with a higher priority are migrated.

In other embodiments, the entire database content is migrated in the background from secondary storage system 112 to server 152 while a user associated with database application 153 is accessing mounted database 118. After an initial migration instance of the database content is completed, the data included in mounted database 118 may be inconsistent with the database content stored in storage volume 156 of server 152. Secondary storage system 112 may clone a view associated with mounted database 118. The cloned view associated with the mounted database 118 may be traversed to identify the data that was added or modified to mounted database 118 during the initial migration instance. Secondary storage system 112 may determine the amount of time needed to migrate the identified data. The amount of time needed to migrate the identified data is compared to a downtime threshold. In some embodiments, the amount of time needed to migrate the identified data is less than the downtime threshold (e.g., 30 seconds), database application 153 is quiesced, and the identified data is migrated to server 152. In other embodiments, the amount of time needed to migrate the identified data is not less than the downtime threshold, a view associated with mounted database 118 is cloned, and the identified data is migrated in the background while the user associated with the server 152 continues to access and use mounted database 118.

Each time a data migration instance is completed, the data included in mounted database 118 may be inconsistent with the database content stored on server 152. An amount of time needed to migrate data to make the data included in mounted database 118 consistent with the database content stored on server 152 is computed. The process described above may be repeated until the amount of time needed to migrate the data to make the data included in mounted database 118 consistent with the database content stored on server 152 is less than the downtime threshold. The amount of time needed to migrate data to make the data included in mounted database 118 consistent with the database content stored on server 152 reduces each time a data migration instance is completed. At some point in time, the amount of time needed to migrate the data to make the data included in mounted database 118 consistent with the database content stored on server 152 is less than a downtime threshold. In the event the amount of time needed to migrate the data to make the data included in mounted database 118 consistent with the database content stored on server 152 is less than the downtime threshold, database application 153 is quiesced and the data to make the data included in mounted database consistent with the database content stored on server 152 is migrated to server 152.

Figure 2A:
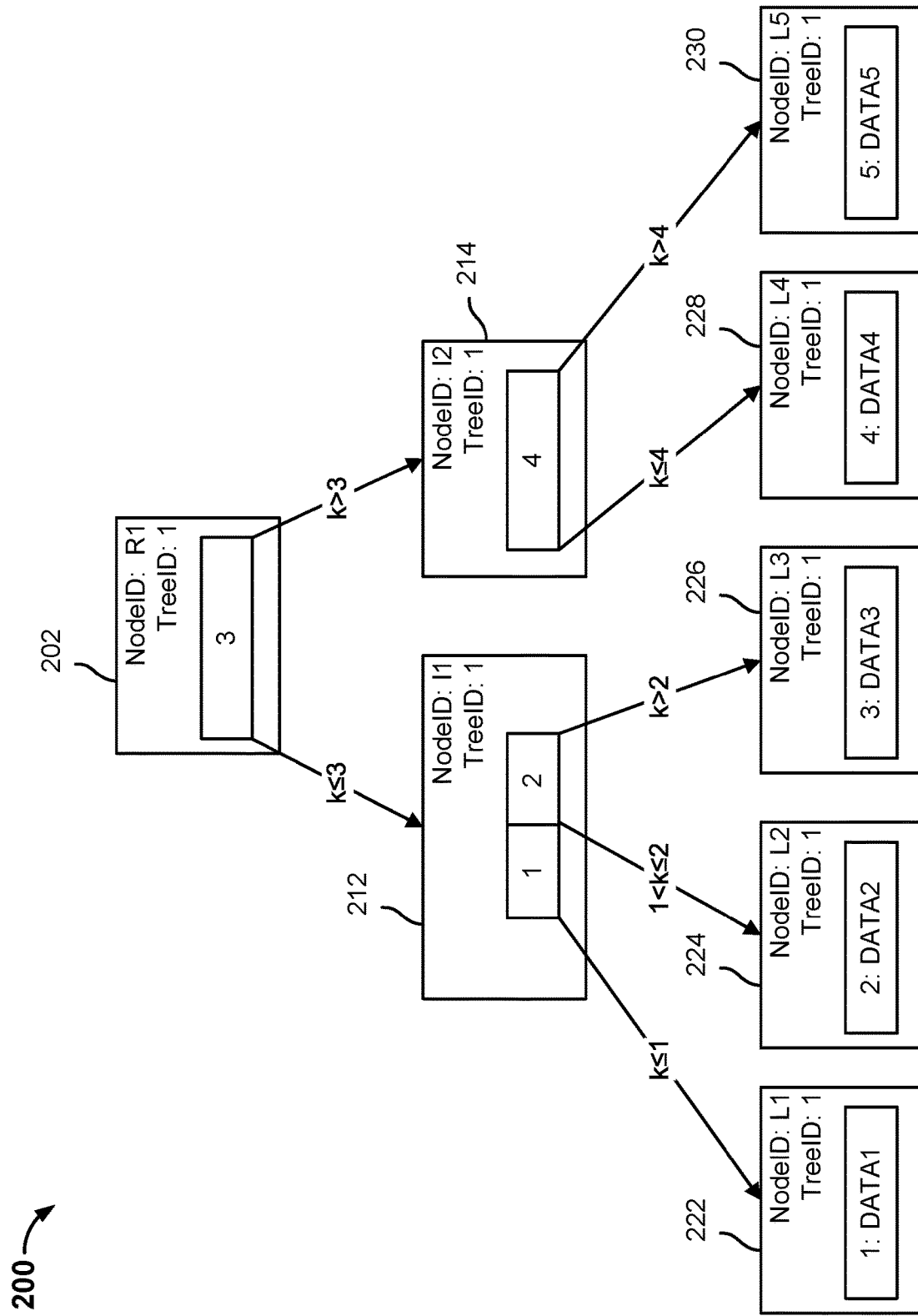
FIG. 2A is a block diagram illustrating an embodiment of a tree data structure.

FIG. 2A is a block diagram illustrating an embodiment of a tree data structure. A tree data structure may be used to represent the file system data that is stored on a secondary storage system, such as secondary storage system 112. The file system data may include metadata for a distributed file system and may include information, such as chunk identifier, chunk offset, file size, directory structure, file permissions, physical storage locations of the files, etc. A file system manager, such as file system manager 117, may generate tree data structure 200.

In the example shown, tree data structure 200 is comprised of a file system metadata snapshot tree that includes a root node 202, intermediate nodes 212, 214, and leaf nodes 222, 224, 226, 228, and 230. Although tree data structure 200 includes one intermediate level between root node 202 and leaf nodes 222, 224, 226, 228, 230, any number of intermediate levels may be implemented. Tree data structure 200 may correspond to a backup snapshot of file system data at a particular point in time t, for example at time to. The backup snapshot may be received from a primary system, such as primary system 102. The file system metadata snapshot tree in conjunction with a plurality of file metadata trees (e.g., Binary Large Objects) may provide a complete view of the primary system associated with the backup snapshot for the particular point in time. The file system metadata snapshot tree may correspond to a full backup snapshot. A full backup snapshot includes all of the file system data stored on a primary system. Tree data structure 200 may correspond to a full backup snapshot.

A root node is the starting point of a file system metadata snapshot tree and may include pointers to one or more other nodes. An intermediate node is a node to which another node points (e.g., root node, other intermediate node) and includes one or more pointers to one or more other nodes. A leaf node is a node at the bottom of a file system metadata snapshot tree. Each node of the tree structure includes a view identifier of a view with which the node is associated (e.g., TreeID).

A leaf node may be configured to store key-value pairs of file system data. A data key k is a lookup value by which a particular leaf node may be accessed. For example, "1" is a data key that may be used to lookup "DATA1" of leaf node 222. The data key k may correspond to a brick number of a data brick. A data brick may be comprised of one or more data blocks. In some embodiments, the leaf node is configured to store file system metadata (e.g., chunk identifier (e.g., hash value, SHA-1, etc.), file size, directory structure, file permissions, physical storage locations of the files, etc.). A leaf node may store a data key k and a pointer to a location that stores the value associated with the data key.

In other embodiments, a leaf node is configured to store the actual data associated with a file when the file is less than or equal to a limit size. For example, data associated with a file that is less than or equal to 256 kB may reside in the leaf node of a snapshot tree. In some embodiments, a leaf node includes a pointer to a file metadata tree (e.g., blob structure) when the size of the file is larger than the limit size. For example, a leaf node may include a pointer to a file metadata tree corresponding to a database file.

A root node or an intermediate node may include one or more node keys. The node key may be an integer value or a non-integer value. Each node key indicates a division between the branches of the node and indicates how to traverse the tree structure to find a leaf node, i.e., which pointer to follow. For example, root node 202 may include a node key of "3." A data key k of a key-value pair that is less than or equal to the node key is associated with a first branch of the node and a data key k of a key-value pair that is greater than the node key is associated with a second branch of the node. In the above example, to find a leaf node storing a value associated with a data key of "1," "2," or "3," the first branch of root node 202 would be traversed to intermediate node 212 because the data keys of "1," "2," and "3" are less than or equal to the node key "3." To find a leaf node storing a value associated with a data key of "4" or "5," the second branch of root node 202 would be traversed to intermediate node 214 because data keys "4" and "5" are greater than the node key of "3."

A data key k of a key-value pair is not limited to a numerical value. In some embodiments, non-numerical data keys may be used for a data key-value pair (e.g., "name," "age", etc.) and a numerical number may be associated with the non-numerical data key. For example, a data key of "name" may correspond to a numerical key of "3." Data keys that alphabetically come before the word "name" or is the word "name" may be found following a left branch associated with a node. Data keys that alphabetically come after the word "name" may be found by following a right branch associated with the node. In some embodiments, a hash function may be associated with the non-numerical data key. The hash function may determine which branch of a node with which the non-numerical data key is associated. The hash function applied to a data key to provide a hash. The hash may determine which branch of a node with which the non-numerical data key is associated.

In the example shown, root node 202 includes a pointer to intermediate node 212 and a pointer to intermediate node 214. Root node 202 includes a NodeID of "R1" and a TreeID of "1." The NodeID identifies the name of the node. The TreeID identifies the view with which the node is associated. When a change is made to data stored in a leaf node as described with respect to FIGS. 2B, 2C, and 2D, the TreeID is used to determine whether a copy of a node is to be made.

Root node 202 includes a node key that divides a set of pointers into two different subsets. Leaf nodes (e.g., "1-3") with a data key k that is less than or equal to the node key are associated with a first branch and leaf nodes (e.g., "4-5") with a data key k that is greater than the node key are associated with a second branch. Leaf nodes with a data key of "1," "2," or "3" may be found by traversing tree data structure 200 from root node 202 to intermediate node 212 because the data keys have a value that is less than or equal to the node key. Leaf nodes with a data key of "4" or "5" may be found by traversing tree data structure 200 from root node 202 to intermediate node 214 because the data keys have a value that is greater than the node key.

Root node 202 includes a first set of pointers. The first set of pointers associated with a data key less than the node key (e.g., "1", "2," or "3") indicates that traversing tree data structure 200 from root node 202 to intermediate node 212 will lead to a leaf node with a data key of "1," "2," or "3." Intermediate node 214 includes a second set of pointers. The second set of pointers associated with a data key greater than the node key indicates that traversing tree data structure 200 from root node 202 to intermediate node 214 will lead to a leaf node with a data key of "4" or "5."

Intermediate node 212 includes a pointer to leaf node 222, a pointer to leaf node 224, and a pointer to leaf node 226. Intermediate node 212 includes a NodeID of "I1" and a TreeID of "1." Intermediate node 212 includes a first node key of "1" and a second node key of "2." The data key k for leaf node 222 is a value that is less than or equal to the first node key. The data key k for leaf node 224 is a value that is greater than the first node key and less than or equal to the second node key. The data key k for leaf node 226 is a value that is greater than the second node key. The pointer to leaf node 222 indicates that traversing tree data structure 200 from intermediate node 212 to leaf node 222 will lead to the node with a data key of "1." The pointer to leaf node 224 indicates that traversing tree data structure 200 from intermediate node 212 to leaf node 224 will lead to the node with a data key of "2." The pointer to leaf node 226 indicates that traversing tree data structure 200 from intermediate node 212 to leaf node 226 will lead to the node with a data key of "3."

Intermediate node 214 includes a pointer to leaf node 228 and a pointer to leaf node 230. Intermediate node 212 includes a NodeID of "I2" and a TreeID of "1." Intermediate node 214 includes a node key of "4." The data key k for leaf node 228 is a value that is less than or equal to the node key. The data key k for leaf node 230 is a value that is greater than the node key. The pointer to leaf node 228 indicates that traversing tree data structure 200 from intermediate node 214 to leaf node 228 will lead to the node with a data key of "4." The pointer to leaf node 230 indicates that traversing tree data structure 200 from intermediate node 214 to leaf node 230 will lead the node with a data key of "5."

Leaf node 222 includes a data key-value pair of "1: DATA1." Leaf node 222 includes NodeID of "L1" and a TreeID of "1." To view the value associated with a data key of "1," tree data structure 200 is traversed from root node 202 to intermediate node 212 to leaf node 222. In some embodiments, leaf node 222 is configured to store metadata associated with a file. In some embodiments, leaf node 222 is configured to store data associated with a file. In other embodiments, leaf node 222 is configured to store a pointer to a file metadata tree. For example, leaf node 222 may store a pointer to a file metadata tree corresponding to a database file.

Leaf node 224 includes a data key-value pair of "2: DATA2." Leaf node 224 includes NodeID of "L2" and a TreeID of "1." To view the value associated with a data key of "2," tree data structure 200 is traversed from root node 202 to intermediate node 212 to leaf node 224. In some embodiments, leaf node 224 is configured to store metadata associated with a file. In some embodiments, leaf node 224 is configured to store data associated with a file. In other embodiments, leaf node 224 is configured to store a pointer to a file metadata tree. For example, leaf node 224 may store a pointer to a file metadata tree corresponding to a database file.

Leaf node 226 includes a data key-value pair of "3: DATA3." Leaf node 226 includes NodeID of "L3" and a TreeID of "1." To view the value associated with a data key of "3," tree data structure 200 is traversed from root node 202 to intermediate node 212 to leaf node 226. In some embodiments, leaf node 226 is configured to store metadata associated with a file. In some embodiments, leaf node 226 is configured to store data associated with a file. In other embodiments, leaf node 226 is configured to store a pointer to a file metadata tree. For example, leaf node 226 may store a pointer to a file metadata tree corresponding to a database file.

Leaf node 228 includes a data key-value pair of "4: DATA4." Leaf node 228 includes NodeID of "L4" and a TreeID of "1." To view the value associated with a data key of "4," tree data structure 200 is traversed from root node 202 to intermediate node 214 to leaf node 228. In some embodiments, leaf node 228 is configured to store metadata associated with a file. In some embodiments, leaf node 228 is configured to store data associated with a file. In other embodiments, leaf node 228 is configured to store a pointer to a file metadata tree. For example, leaf node 228 may store a pointer to a file metadata tree corresponding to a database file.

Leaf node 230 includes a data key-value pair of "5: DATA5." Leaf node 230 includes NodeID of "L5" and a TreeID of "1." To view the value associated with a data key of "5," tree data structure 200 is traversed from root node 202 to intermediate node 214 to leaf node 230. In some embodiments, leaf node 230 is configured to store metadata associated with a file. In some embodiments, leaf node 230 is configured to store data associated with a file. In other embodiments, leaf node 230 is configured to store a pointer to a file metadata tree. For example, leaf node 230 may store a pointer to a file metadata tree corresponding to a database file.

Figure 2B:
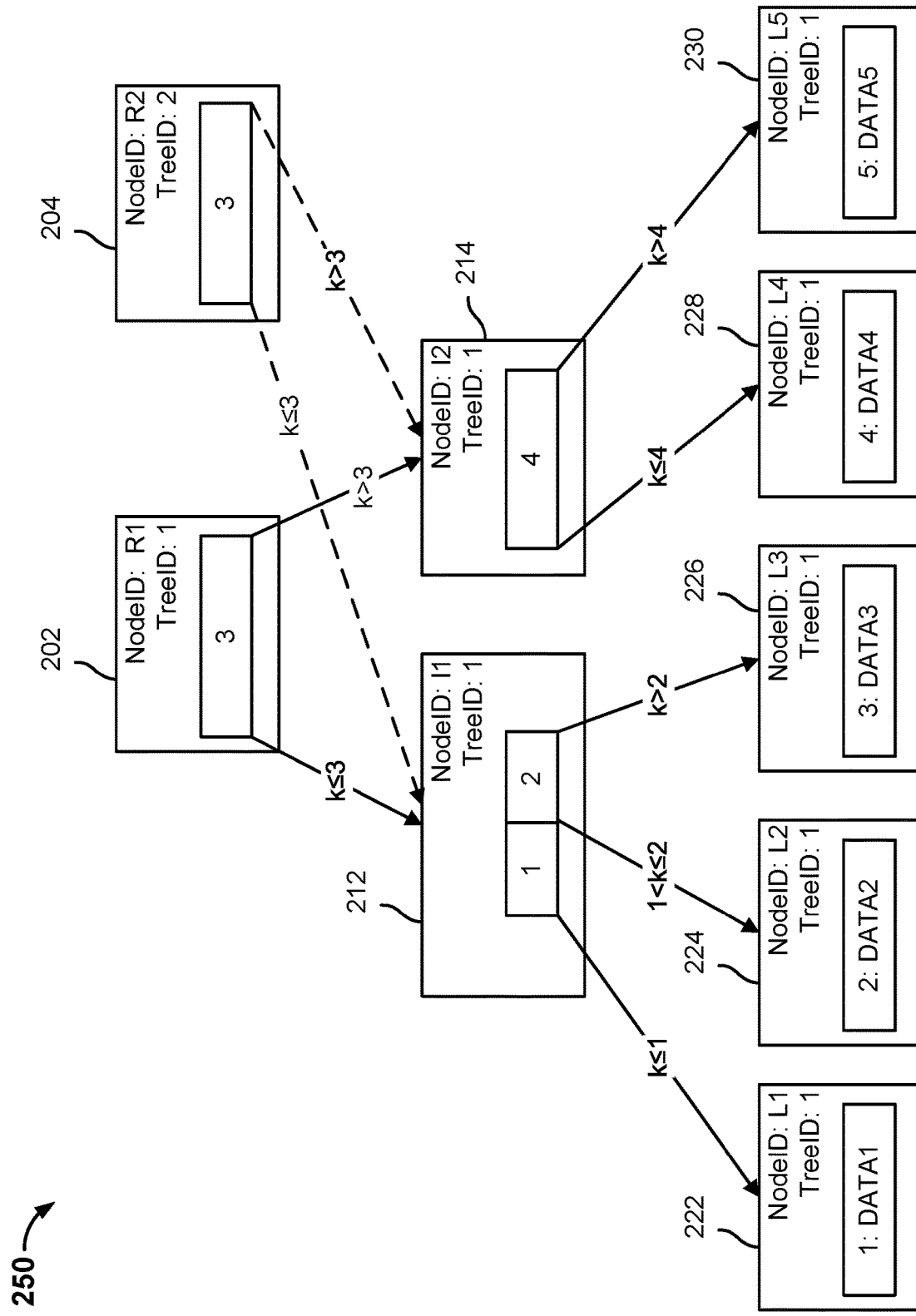
FIG. 2B is a block diagram illustrating an embodiment of a cloned file system metadata snapshot tree.

FIG. 2B is a block diagram illustrating an embodiment of a cloned file system metadata snapshot tree. A file system metadata snapshot tree may be cloned when a file system metadata snapshot tree is added to a tree data structure. A file system metadata snapshot tree may be added to the tree data structure when a backup snapshot is received. In some embodiments, tree data structure 250 may be created by a storage system, such as secondary storage system 112. The file system data of a primary system, such as primary system 102, may be backed up to a secondary storage system, such as secondary storage system 112. A subsequent backup snapshot may correspond to a full backup snapshot or an incremental backup snapshot. The manner in which the file system data corresponding to the subsequent backup snapshot is stored in secondary storage system may be represented by a tree data structure. The tree data structure corresponding to the subsequent backup snapshot may be created by cloning a file system metadata snapshot tree associated with a last backup.

In other embodiments, a file system metadata snapshot tree is cloned when data associated with the file system metadata snapshot tree is mounted. The data associated with the file system metadata snapshot tree may include one or more database files. The data of one or more database files may be mounted and a user associated with an external server may have access to the mounted database. The user associated with an external server may make one or more modifications to the data included in the mounted database. One or more corresponding modifications to the cloned file system metadata snapshot tree may be made, as disclosed herein, to reflect the one or more modifications to the data included in the mounted database.

In other embodiments, a file system metadata snapshot tree is cloned when data associated with a mounted database is migrated to a server. Cloning a file system metadata snapshot tree preserves the state associated with the mounted database. One or more modifications may be made to a cloned file system metadata snapshot tree without affecting the state associated with the file system metadata snapshot tree that was cloned.

In the example shown, the subsequent backup snapshot corresponds to an incremental backup snapshot. Tree data structure 250 includes root nodes 202, 204, intermediate nodes 212, 214, and leaf nodes 222, 224, 226, 228, and 230. Tree data structure 250 may be a snapshot of file system data at a particular point in time t+n. The tree data structure can be used to capture different versions of file system data at different moments in time. The tree data structure may also be used to efficiently locate desired metadata/data by traversing a particular version of a file system metadata snapshot tree included in the tree data structure. In some embodiments, the tree data structure allows a chain of backup snapshot versions (i.e., file system metadata snapshot trees) to be linked together by allowing a node of a later version of a file system metadata snapshot tree to reference a node of a previous version of a file system metadata snapshot tree. For example, a file system metadata snapshot tree with root node 204 is linked to a file system metadata snapshot tree with root node 202. Each time a backup snapshot is received, a new root node may be created and the new root node may include the same set of pointers included in the previous root node, that is the new root node of the file system metadata snapshot tree may be linked to one or more intermediate nodes associated with a previous file system metadata snapshot tree. The new root node also includes a different NodeID and a different TreeID. The TreeID is the view identifier associated with a view of the primary system associated with the backup snapshot for the particular moment in time.

In some embodiments, a root node of a file system metadata snapshot tree is associated with a current view of the file system data. A current view may still accept one or more changes to the data. The TreeID of a root node indicates a backup snapshot with which the root node is associated. For example, root node 202 with a TreeID of "1" is associated with a first backup snapshot and root node 204 with a TreeID of "2" is associated with a second backup snapshot. In the example shown, root node 204 is associated with a current view of the file system data.

In other embodiments, a root node of a file system metadata snapshot tree is associated with a snapshot view of the file system data. A snapshot view may represent a state of the file system data at a particular moment in time in the past and is not updated. In the example shown, root node 202 is associated with a snapshot view of the file system data.

In the example shown, root node 204 is a copy of root node 202. Similar to root node 202, root node 204 includes the same pointers as root node 202. Root node 204 includes a first set of pointers to intermediate node 212. The first set of pointers associated with a data key k less than or equal to the node key (e.g., "1," "2," or "3") indicates that traversing tree data structure 250 from root node 204 to intermediate node 212 will lead to a leaf node with a data key of "1," "2," or "3." Root node 204 includes a second set of pointers to intermediate node 214. The second set of pointers associated with a data key k greater than the node key indicates that traversing tree data structure 250 from root node 204 to intermediate node 214 will lead to a leaf node with a data key of "4" or "5." Root node 204 includes a NodeID of "R2"

and a TreeID of "2." The NodeID identifies the name of the node. The TreeID identifies the backup snapshot with which the node is associated.

Figure 2C:
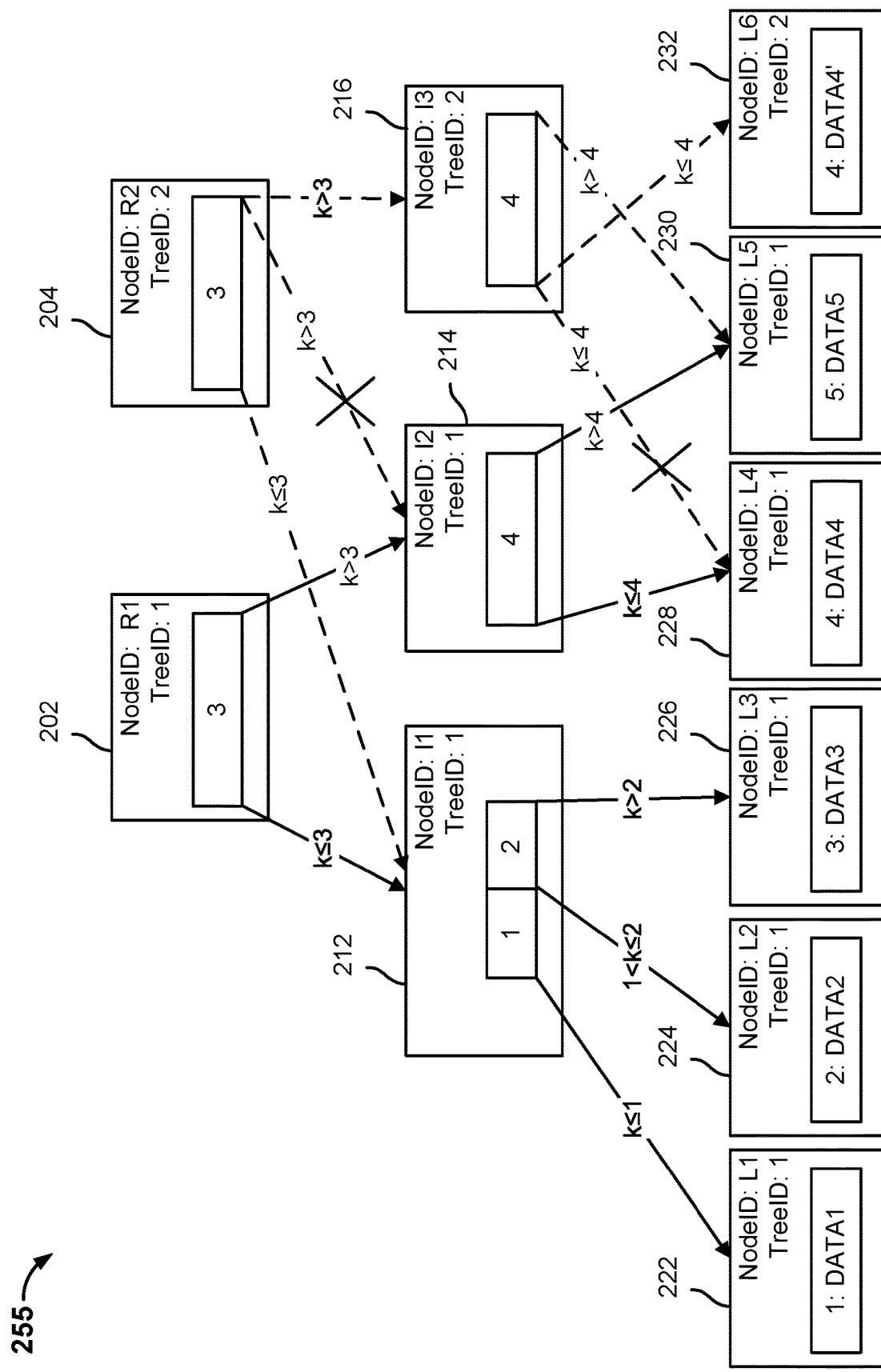
FIG. 2C is a block diagram illustrating an embodiment of modifying a file system metadata snapshot tree.

FIG. 2C is a block diagram illustrating an embodiment of modifying a file system metadata snapshot tree. A file system metadata snapshot tree may be modified based on the data included in a backup snapshot. In the example shown, tree data structure 255 may be modified based on data included in an incremental backup snapshot. In other embodiments, a file system metadata snapshot tree is modified based on one or more modifications corresponding to the one or more modifications made to data included in a mounted database.

Tree data structure 255 may be modified by a file system manager, such as file system manager 117. A file system metadata snapshot tree with a root node 204 may be a current view of the file system data at time t+n+m, for example, at time $t_2$. A current view represents a state of the file system data that is up-to-date and capable of receiving one or more modifications to the file system metadata snapshot tree that correspond to modifications to the file system data. Because a snapshot represents a perspective of the file system data that is "frozen" in time, one or more copies of one or more nodes affected by a change to file system data, are made. A file system metadata snapshot tree with a root node 202 may be a snapshot view of the file system data at time $t_2$.

In the example shown, the value "DATA4" has been modified to be "DATA4'." In some embodiments, the value of a key value pair has been modified. For example, the value of "DATA4" may be a pointer to a file metadata tree corresponding to a first version of a database file and the value of "DATA4'" may be a pointer to a file metadata tree corresponding to a second version of the database file. In other embodiments, the value of the key pair is the data associated with a content file that is smaller than or equal to a limit size. In other embodiments, the value of the key value pair points to a different file metadata tree. The different file metadata tree may be a modified version of the file metadata tree that the leaf node previously pointed.

At $t_2$, the file system manager starts at root node 204 because that is the root node associated with file system metadata snapshot tree at time $t_2$ (i.e., the root node associated with the last backup snapshot). The value "DATA4" is associated with the data key "4." The file system manager traverses file system metadata snapshot tree 255 from root node 204 until it reaches a target node, in this example, leaf node 228. The file system manager compares the TreeID at each intermediate node and leaf node with the TreeID of the root node. In the event the TreeID of a node matches the TreeID of the root node, the file system manager proceeds to the next node. In the event the TreeID of a node does not match the TreeID of the root node, a shadow copy of the node with the non-matching TreeID is made. For example, to reach a leaf node with a data key of "4," the file system manager begins at root node 204 and proceeds to intermediate node 214. The file system manager compares the TreeID of intermediate node 214 with the TreeID of root node 204, determines that the TreeID of intermediate node 214 does not match the TreeID of root node 204, and creates a copy of intermediate node 214. The intermediate node copy 216 includes the same set of pointers as intermediate node 214, but includes a TreeID of "2" to match the TreeID of root node 204. The file system manager updates a pointer of root node 204 to point to intermediate node 216 instead of pointing to intermediate node 214. The file system manager traverses tree data structure 255 from intermediate node 216 to leaf node 228, determines that the TreeID of leaf node 228 does not match the TreeID of root node 204, and creates a copy of leaf node 228. Leaf node copy 232 stores the modified value "DATA4'" and includes the same TreeID as root node 204. The file system manager updates a pointer of intermediate node 216 to point to leaf node 232 instead of pointing to leaf node 228.

In some embodiments, leaf node 232 stores the value of a key value pair that has been modified. In other embodiments, leaf node 232 stores the modified data associated with a file that is smaller than or equal to a limit size. In other embodiments, leaf node 232 stores a pointer to a file metadata tree corresponding to a file, such as a database file.

Figure 2D:
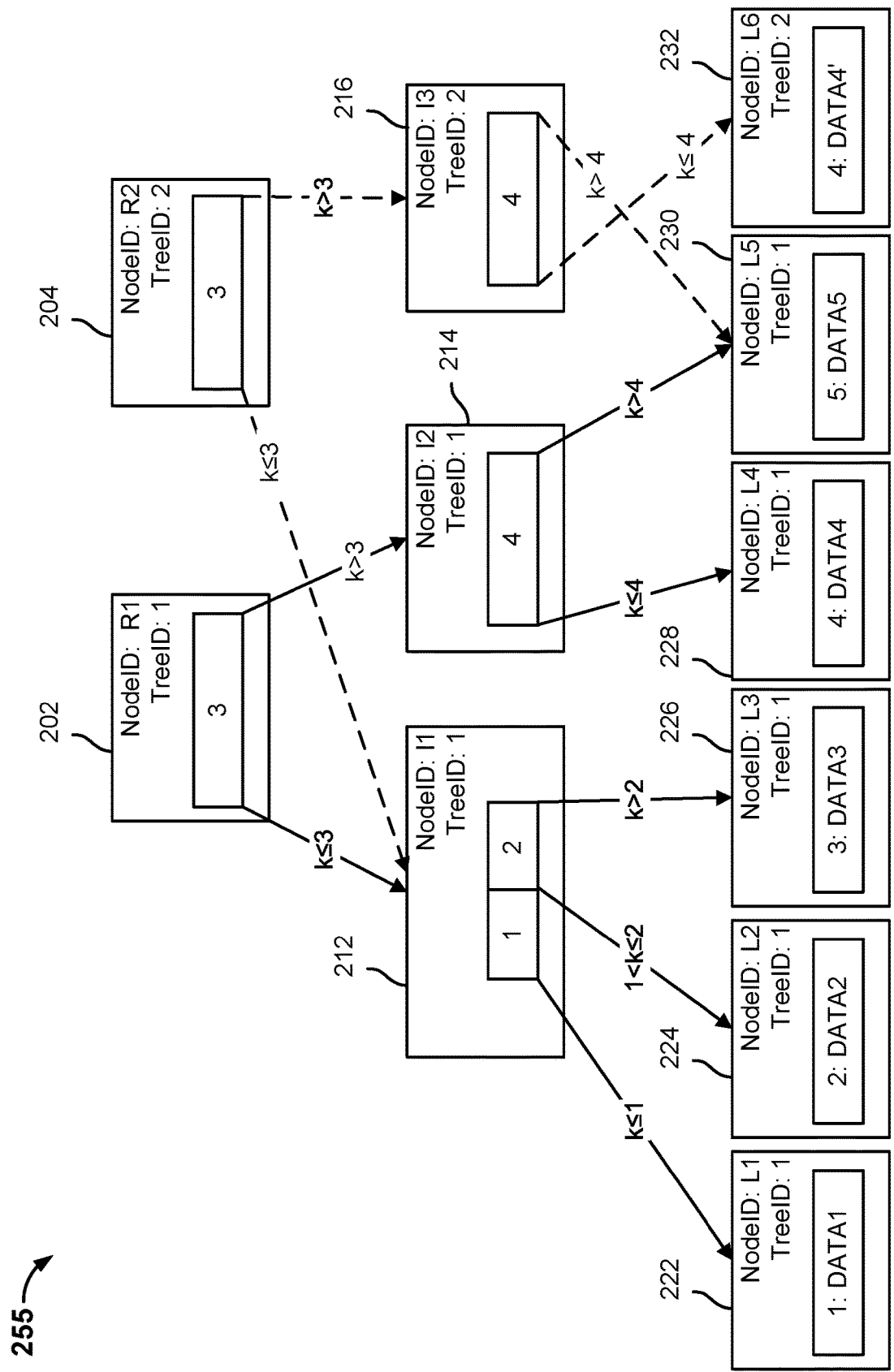
FIG. 2D is a block diagram illustrating an embodiment of a modified file system metadata snapshot tree.

FIG. 2D is a block diagram illustrating an embodiment of a modified file system metadata snapshot tree. Tree data structure 255 shown in FIG. 2D illustrates a result of the modifications made to a snapshot tree as described with respect to FIG. 2C.

Figure 3A:
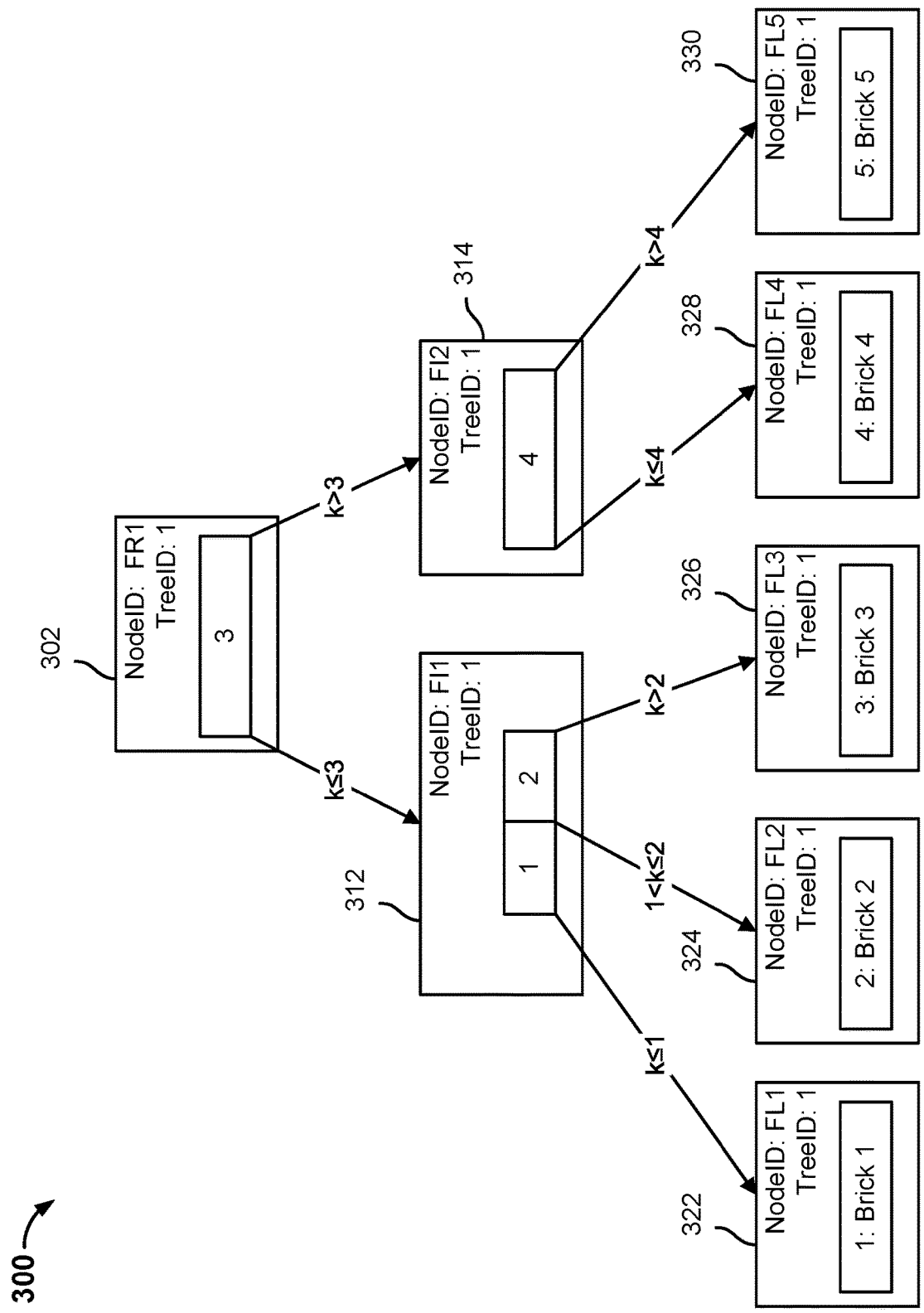
FIG. 3A is a block diagram illustrating an embodiment of a tree data structure.

FIG. 3A is a block diagram illustrating an embodiment of a tree data structure. In some embodiments, tree data structure 300 may be created by a storage system, such as secondary storage system 112. In the example shown, tree data structure 300 corresponds to a file and stores the metadata associated with the file. For example, tree data structure 300 may correspond to a database file and may be used to store the metadata associated with the database file. A leaf node of a file system metadata snapshot tree, such as a leaf node of tree data structures 200, 250, 255, may include a pointer to a tree data structure corresponding to a file, such as tree data structure 300. A tree data structure corresponding to a file (i.e., a "file metadata tree") is a snapshot tree, but is used to organize the metadata associated with a file that is stored on the secondary storage system. Tree data structure 300 may be referred to as a "metadata structure" or a "snapshot structure."

A tree data structure corresponding to a content file (e.g., database file) at a particular point in time (e.g., a particular version) may be comprised of a root node, one or more levels of one or more intermediate nodes, and one or more leaf nodes. In some embodiments, a tree data structure corresponding to a content file is comprised of a root node and one or more leaf nodes without any intermediate nodes. Tree data structure 300 may be a snapshot of a content file at a particular point in time t, for example at time to.

In the example shown, tree data structure 300 includes a file root node 302, file intermediate nodes 312, 314, and file leaf nodes 322, 324, 326, 328, 330. Although tree data structure 300 includes one intermediate level between root node 302 and leaf nodes 322, 324, 326, 328, 330, any number of intermediate levels may be implemented. Similar of the file system metadata snapshot trees described above, each node includes a "NodeID" that identifies the node and a "TreeID" that identifies a backup snapshot/view with which the node is associated.

In the example shown, root node 302 includes a pointer to intermediate node 312 and a pointer to intermediate node 314. Root node 202 includes a NodeID of "FR1" and a TreeID of "1." The NodeID identifies the name of the node. The TreeID identifies the snapshot/view with which the node is associated.

In the example shown, intermediate node 312 includes a pointer to leaf node 322, a pointer to leaf node 324, and a pointer to leaf node 326. Intermediate node 312 includes a NodeID of "FI1" and a TreeID of "1." Intermediate node 312 includes a first node key and a second node key. The data key k for leaf node 322 is a value that is less than or equal to the first node key. The data key for leaf node 324 is a value that is greater than the first node key and less than or equal to the second node key. The data key for leaf node 326 is a value that is greater than the second node key. The pointer to leaf node 322 indicates that traversing tree data structure 300 from intermediate node 312 to leaf node 322 will lead to the node with a data key of "1." The pointer to leaf node 324 indicates that traversing tree data structure 300 from intermediate node 312 to leaf node 324 will lead to the node with a data key of "2." The pointer to leaf node 326 indicates that traversing tree data structure 300 from intermediate node 312 to leaf node 326 will lead to the node with a data key of "3."

In the example shown, intermediate node 314 includes a pointer to leaf node 328 and a pointer to leaf node 330. Intermediate node 314 includes a NodeID of "FI2" and a TreeID of "1." Intermediate node 314 includes a node key. The data key k for leaf node 328 is a value that is less than or equal to the node key. The data key for leaf node 330 is a value that is greater than the node key. The pointer to leaf node 328 indicates that traversing tree data structure 300 from intermediate node 314 to leaf node 328 will lead to the node with a data key of "4." The pointer to leaf node 330 indicates that traversing tree data structure 300 from intermediate node 314 to leaf node 330 will lead the node with a data key of "5."

Leaf node 322 includes a data key-value pair of "1: Brick 1." "Brick 1" is a brick identifier that identifies the data brick containing one or more data chunks associated with a content file corresponding to tree data structure 300. Leaf node 322 includes NodeID of "FL1" and a TreeID of "1." To view the value associated with a data key of "1," tree data structure 300 is traversed from root node 302 to intermediate node 312 to leaf node 322.

Leaf node 324 includes a data key-value pair of "2: Brick 2." "Brick 2" is a brick identifier that identifies the data brick containing one or more data chunks associated with a content file corresponding to tree data structure 300. Leaf node 324 includes NodeID of "FL2" and a TreeID of "1." To view the value associated with a data key of "2," tree data structure 300 is traversed from root node 302 to intermediate node 312 to leaf node 324.

Leaf node 326 includes a data key-value pair of "3: Brick 3." "Brick 3" is a brick identifier that identifies the data brick containing one or more data chunks associated with a content file corresponding to tree data structure 300. Leaf node 326 includes NodeID of "FL3" and a TreeID of "1." To view the value associated with a data key of "3," tree data structure 300 is traversed from root node 302 to intermediate node 312 to leaf node 326.

Leaf node 328 includes a data key-value pair of "4: Brick 4." "Brick 4" is a brick identifier that identifies the data brick containing one or more data chunks associated with a content file corresponding to tree data structure 300. Leaf node 328 includes NodeID of "FL4" and a TreeID of "1." To view the value associated with a data key of "4," tree data structure 300 is traversed from root node 302 to intermediate node 314 to leaf node 328.

Leaf node 330 includes a data key-value pair of "5: Brick 5." "Brick 5" is a brick identifier that identifies the data brick containing one or more data chunks associated with a content file corresponding to tree data structure 300. Leaf node 330 includes NodeID of "FL5" and a TreeID of "1." To view the value associated with a data key of "5," tree data structure 300 is traversed from root node 302 to intermediate node 314 to leaf node 330.

A file, such as a database file, may be comprised of a plurality of data chunks. A brick may store one or more data chunks. In the example shown, leaf nodes 322, 324, 326, 328, 330 each store a corresponding brick identifier. A metadata store may include a data structure that matches a brick identifier with a corresponding location (physical location) of the one or more data chunks comprising the brick. In some embodiments, the data structure matches a brick identifier with a file offset corresponding to data and a database file that corresponds to the file offset. The location of the data brick may be identified using a data structure (e.g., list, table, etc.) stored in a metadata store that matches brick identifiers to a physical storage location or the location of the data brick may be identified based on the pointer to the data brick. In some embodiments, the data structure associates brick identifiers with chunk identifiers (e.g., hashes). The data structure or a different data structure may associate chunk identifiers with a brick offset. A chunk may be associated with a chunk table, which contains a corresponding chunk file ID. The chunk file ID is associated with a chunk file table, which indicates the location of the data (e.g., an offset in a data brick).

Figure 3B:
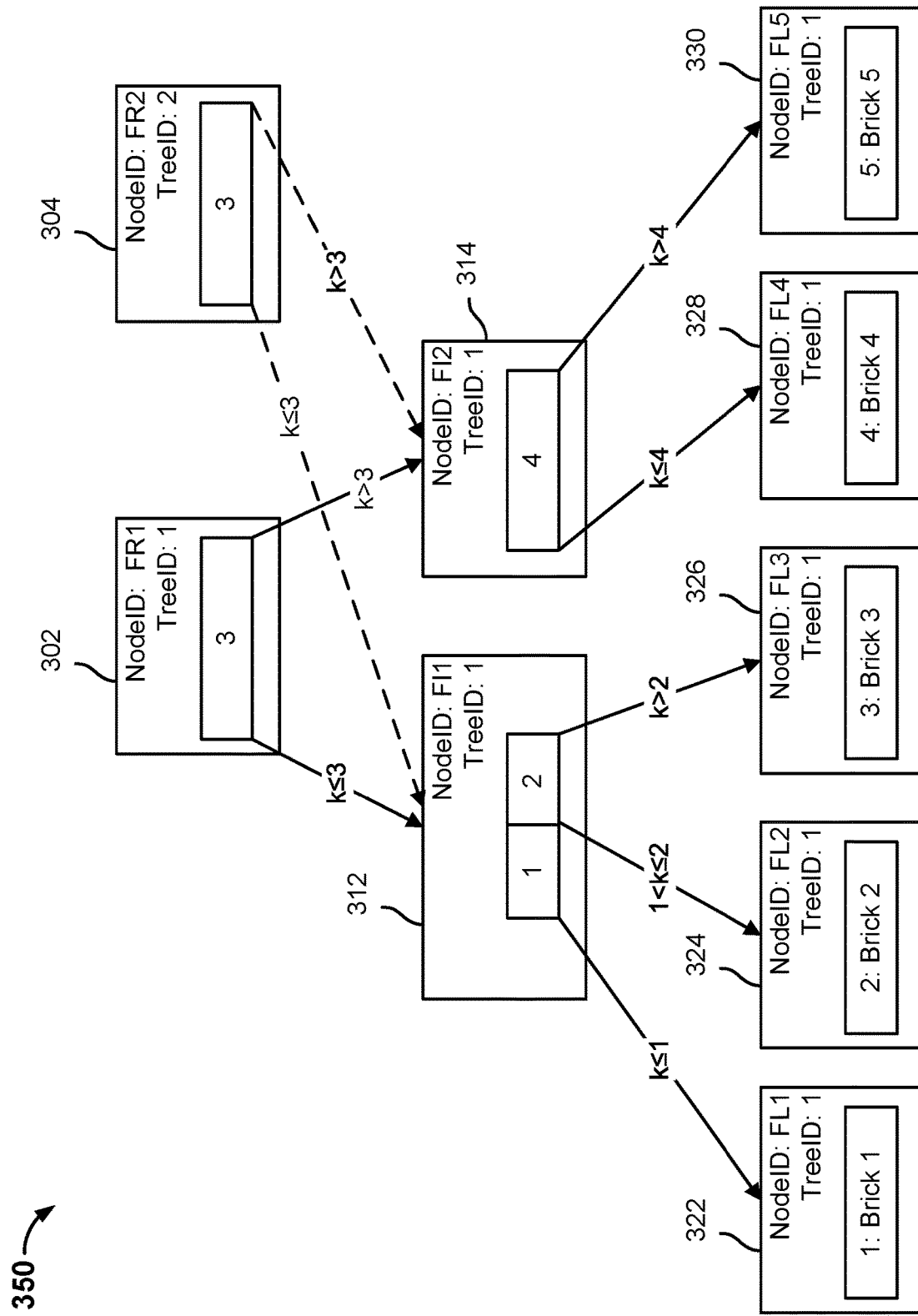
FIG. 3B is a block diagram illustrating an embodiment of a cloned file metadata tree.

FIG. 3B is a block diagram illustrating an embodiment of a cloned file metadata tree. A file metadata tree may be cloned when a file metadata tree is added to a tree data structure. A file metadata tree may be added to the tree data structure when a backup snapshot is received. A subsequent backup snapshot may correspond to an incremental backup snapshot. The manner in which the file data included in a subsequent backup snapshot is organized in the secondary storage system may be represented by a tree data structure. The tree data structure corresponding to file data included in the subsequent backup snapshot may be created by cloning a file metadata tree associated with a previous backup snapshot. In some embodiments, tree data structure 350 may be created by a storage system, such as secondary storage system 112. A tree data structure corresponding to a file, such as a database file, is a snapshot tree, but stores metadata associated with the file (e.g., the metadata associated with the database file).

In other embodiments, a file metadata tree is cloned when data associated with the file metadata tree is mounted. The data associated with the file metadata tree may correspond to a database file. The data of one or more database files may be mounted and a user associated with an external server may have access to the mounted database. The user associated with an external server may make one or more modifications to the data included in the mounted database. One or more corresponding modifications to the cloned file metadata tree may be made, as disclosed herein, to reflect the one or more modifications to a database file included in the mounted database.

In other embodiments, a file metadata tree is cloned when data associated with a mounted database is migrated to a server. Cloning a file metadata tree preserves the state associated with the mounted database. One or more modifications may be made to a cloned file metadata tree without affecting the state associated with the file metadata tree that was cloned.

The tree data structure corresponding to a file can be used to capture different versions of the file at different moments in time. In some embodiments, the tree data structure allows a chain of file metadata trees corresponding to different versions of a file to be linked together by allowing a node of a later version of a file metadata tree to reference a node of a previous version of a file metadata tree. In some embodiments, a root node of a file metadata tree corresponding to a first version of a file is cloned when data associated with the file is modified. The modified data may correspond to a second version of the file.

A file metadata tree is comprised of a root node, one or more levels of one or more intermediate nodes, and one or more leaf nodes. A root node or an intermediate node of a version of a file metadata tree may reference an intermediate node or a leaf node of a previous version of a file metadata tree. Similar to the file system metadata snapshot tree structure, the file metadata tree structure allows different versions of a content file to share nodes and allows changes to a content file to be tracked. When a backup snapshot is received, a root node of the file metadata tree may be linked to one or more intermediate nodes associated with a previous file metadata tree. This may occur when the file is included in both backup snapshots.

In the example shown, tree data structure 350 includes a first file metadata tree comprising root node 302, intermediate nodes 312, 314, and leaf nodes 322, 324, 326, 328, and 330. Tree data structure 350 also includes a second file metadata tree that may be a snapshot of file data at a particular point in time t+n, for example at time $t_1$. The second file metadata tree is comprised of root node 304, intermediate nodes 312, 314, and leaf nodes 322, 324, 326, 328, and 330. The first file metadata tree may provide a snapshot view of the file and correspond to a first version of a database file. The second file metadata tree may provide a current view of the file and correspond to a second version of the database file.

To create a snapshot of the file data at time t+n, a new root node is created. The new root node is a clone of a previous root node and includes the same set of pointers as the previous root node. In the example shown, root node 304 includes a set of pointers to intermediate nodes 312, 314, which are intermediate nodes associated with a previous backup snapshot. The new root node also includes a different NodeID and a different TreeID. The TreeID is the view identifier associated with a view of the file metadata tree at a particular moment in time. In some embodiments, root node 304 is associated with a current view of the file data. The current view may represent a state of the file data that is up-to-date and is capable of receiving one or more modifications to the file metadata tree that correspond to modifications to the file data. The TreeID of a root node indicates a backup snapshot with which the root node is associated. For example, root node 302 with a TreeID of "1" is associated with a first backup snapshot and root node 304 with a TreeID of "2" is associated with a second backup snapshot. In other embodiments, root node 304 is associated with a snapshot view of the file data. A snapshot view may represent a state of the file data at a particular moment in time in the past and is not updated.

In the example shown, root node 304 is a copy of root node 302. Similar to root node 302, root node 304 includes the same pointers as root node 302. Root node 304 includes a first set of pointers to intermediate node 312. The first set of pointers associated with a data key (e.g., "1," "2," or "3") less than or equal the node key indicates that traversing a file metadata tree included in tree data structure 350 from root node 304 to intermediate node 312 will lead to a leaf node with a data key of "1," "2," or "3." Root node 304 includes a second set of pointers to intermediate node 314. The second set of pointers associated with a data key greater than the node key indicates that traversing a file metadata tree included in tree data structure 350 from root node 304 to intermediate node 314 will lead to a leaf node with a data key of "4" or "5." Root node 304 includes a NodeID of "FR2" and a TreeID of "2." The NodeID identifies the name of the node. The TreeID identifies the backup snapshot with which the node is associated.

Figure 3C:
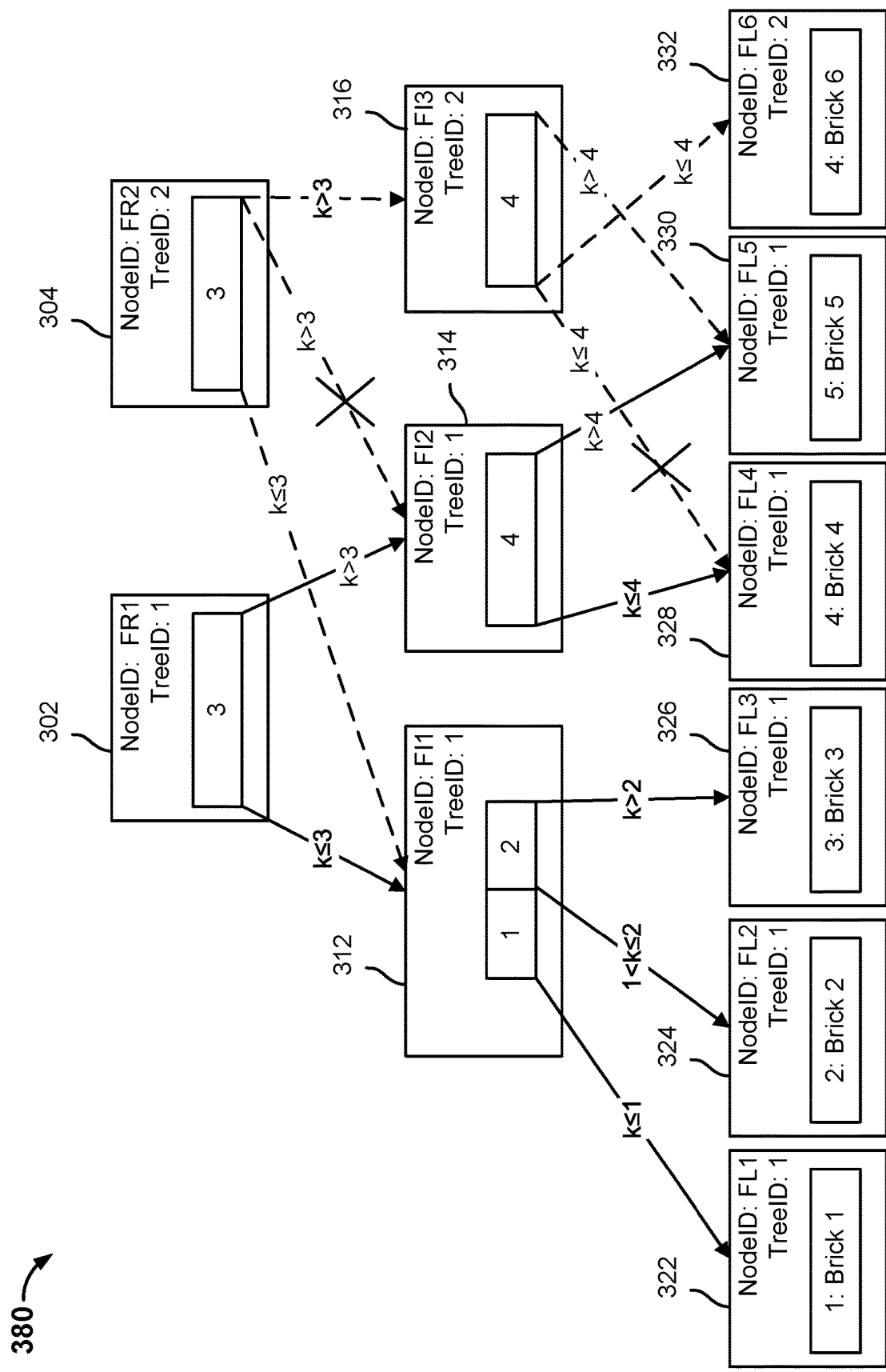
FIG. 3C is a block diagram illustrating an embodiment of modifying a file metadata tree.

FIG. 3C is a block diagram illustrating an embodiment of modifying a file metadata tree. In the example shown, tree data structure 380 may be modified based on data included in an incremental backup snapshot. In other embodiments, tree data structure 380 may be modified based on one or more modifications to data included in a mounted database.

Tree data structure 380 may be modified by a file system manager, such as file system manager 117. A file metadata tree with root node 304 may be a current view of the file data at time t+n+m, for example, at time $t_2$. A current view may represent a state of the file data that is up-to-date and capable of receiving one or more modifications to the file metadata tree that correspond to modifications to the file system data. Because a snapshot represents a perspective of the file data that is "frozen" in time, one or more copies of one or more nodes affected by a change to file data, are made.

In some embodiments, the file data may be modified such that one of the data chunks is replaced by another data chunk. When a data chunk of file data associated with a previous backup snapshot is replaced with a new data chunk, the data brick storing the data chunk may be different. A leaf node of a file metadata tree stores a brick identifier associated with a particular brick containing the data chunk. To represent this modification to the file data, a corresponding modification is made to a current view of a file metadata tree. The current view of the file metadata tree is modified because the previous file metadata tree is a snapshot view and can no longer be modified. The data chunk of the file data that was replaced has a corresponding leaf node in the previous file metadata tree. A new leaf node in the current view of the file metadata tree is created, as described herein, that corresponds to the new data chunk.

The new leaf node includes an identifier associated with the current view. The new leaf node may also store the chunk identifier associated with the modified data chunk.

In the example shown, a data chunk included in "Brick 4" has been modified. The data chunk included in "Brick 4" has been replaced with a data chunk included in "Brick 6." At $t_2$, the file system manager starts at root node 304 because that is the root node associated with the file metadata tree at time $t_2$. The value "Brick 4" is associated with the data key "4." The file system manager traverses tree data structure 380 from root node 304 until it reaches a target node, in this example, leaf node 328. The file system manager compares the TreeID at each intermediate node and leaf node with the TreeID of the root node. In the event the TreeID of a node matches the TreeID of the root node, the file system manager proceeds to the next node. In the event the TreeID of a node does not match the TreeID of the root node, a shadow copy of the node with the non-matching TreeID is made. For example, to reach a leaf node with a data key of "4," the file system manager begins at root node 304 and proceeds to intermediate node 314. The file system manager compares the TreeID of intermediate node 314 with the TreeID of root node 304, determines that the TreeID of intermediate node 314 does not match the TreeID of root node 304, and creates a copy of intermediate node 314. The intermediate node copy 316 includes the same set of pointers as intermediate node 314, but includes a TreeID of "2" to match the TreeID of root node 304. The file system manager updates a pointer of root node 304 to point to intermediate node 316 instead of pointing to intermediate node 314. The file system manager traverses tree data structure 380 from intermediate node 316 to leaf node 328, determines that the TreeID of leaf node 328 does not match the TreeID of root node 304, and creates a copy of leaf node 328. Leaf node 332 is a copy of leaf node 328, but stores the brick identifier "Brick 6" and includes the same TreeID as root node 304. The file system manager updates a pointer of intermediate node 316 to point to leaf node 332 instead of pointing to leaf node 328.

Figure 3D:
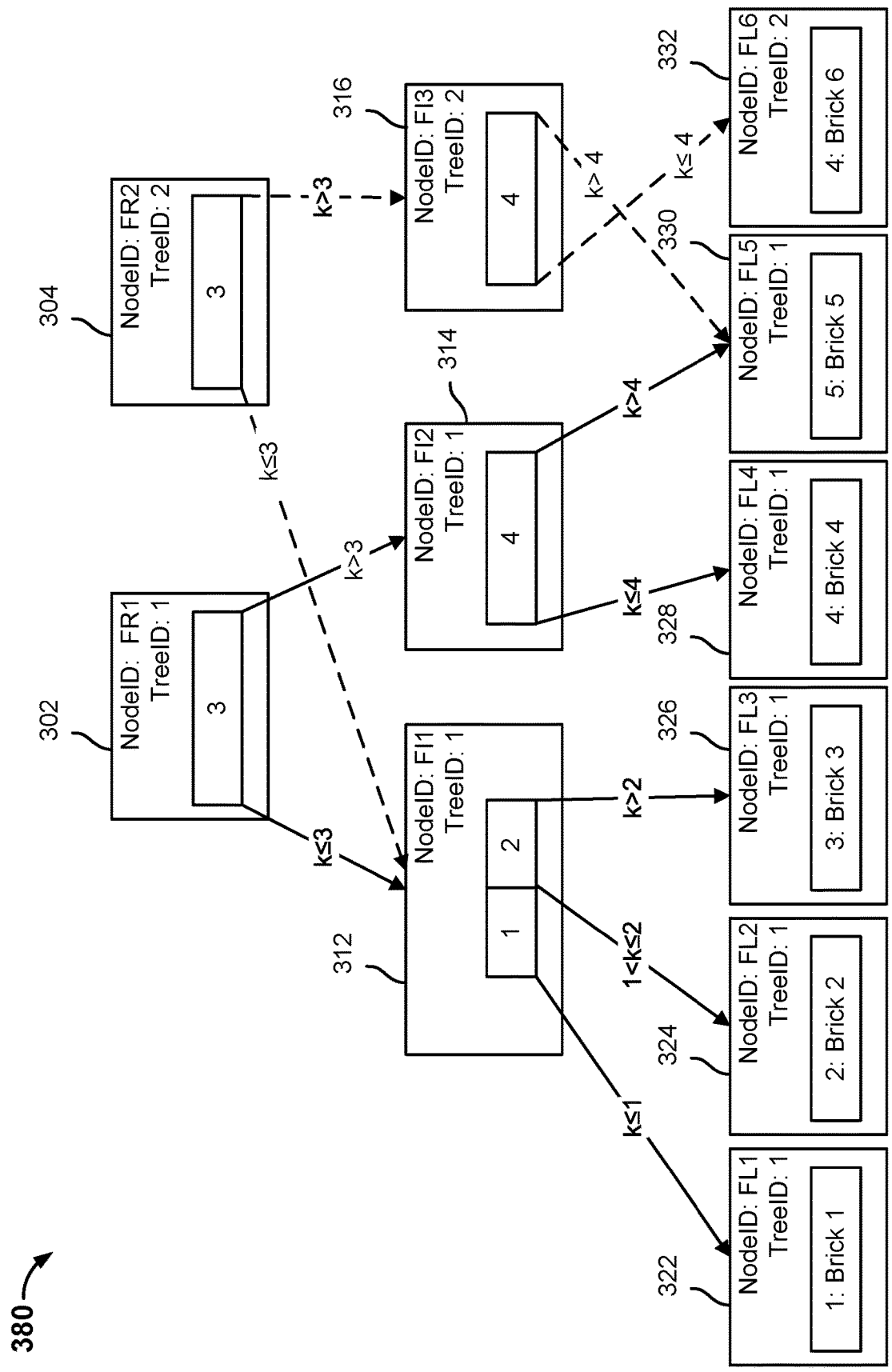
FIG. 3D is a block diagram illustrating an embodiment of a modified file metadata tree.

FIG. 3D is a block diagram illustrating an embodiment of a modified file metadata tree. The file metadata tree 380 shown in FIG. 3D illustrates a result of the modifications made to file metadata tree 380 as described with respect to FIG. 3C.

Figure 4A:
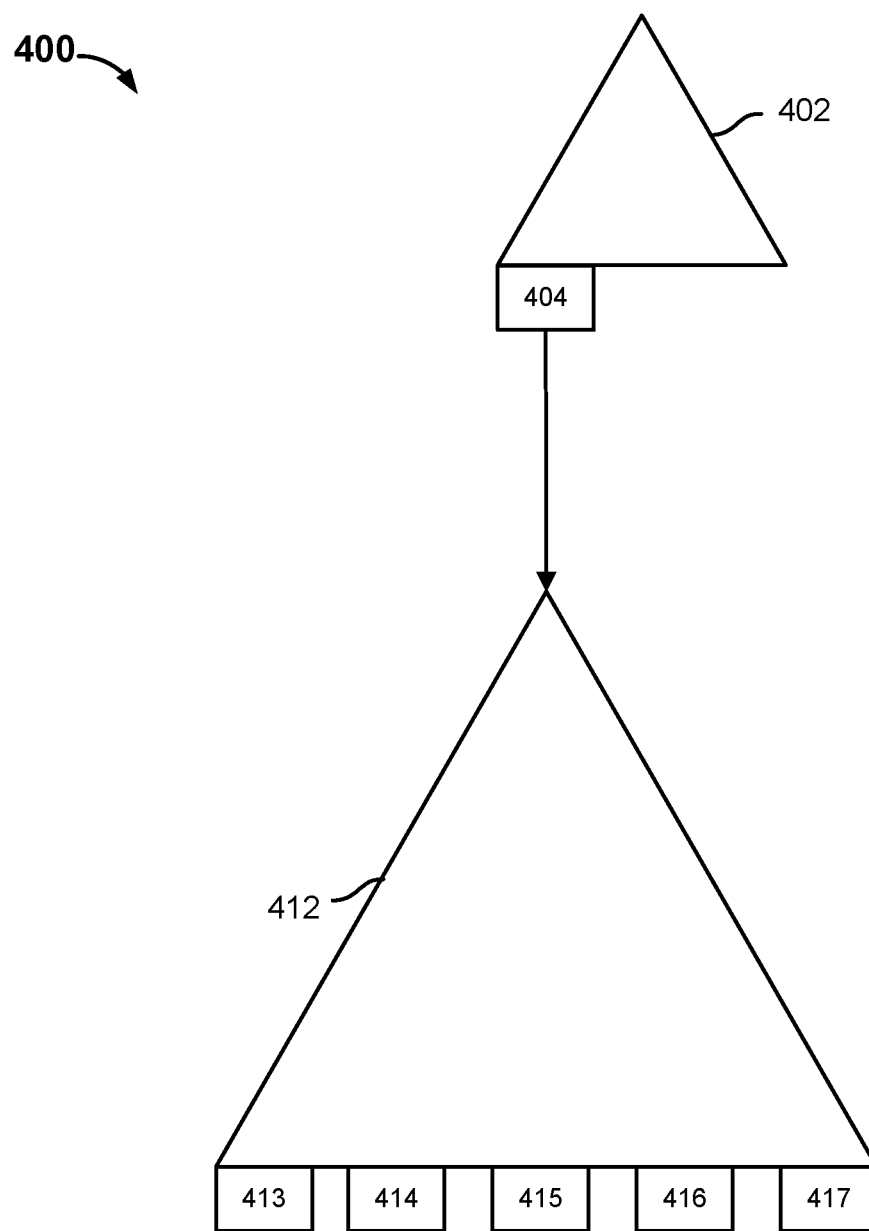
FIG. 4A is a diagram illustrating an embodiment of a view of file system data.

FIG. 4A is a diagram illustrating an embodiment of a view of file system data. In the example shown, file system data view 400 may be generated by a file system manager, such as file system manager 117.

File system data view 400 may correspond to a first backup snapshot of file system data. File system data view 400 includes a file system metadata snapshot tree 402 and file metadata tree 412. File system metadata snapshot tree 402 includes leaf node 404. Leaf node 404 includes a pointer to a root node of file metadata tree 412. File system metadata snapshot tree 402 may include other leaf nodes that are not shown for explanation purposes. The other leaf nodes may include pointers to other corresponding file metadata trees.

File metadata tree 412 is configured to store the metadata associated with a first version of a content file. The content file may correspond to a database file. File metadata tree includes leaf nodes 413, 414, 415, 416, 417. Each leaf node has a corresponding identifier of a data brick containing one or more data chunks of the content file or a corresponding pointer to the data brick containing the one or more data chunks of the content file.

Figure 4B:
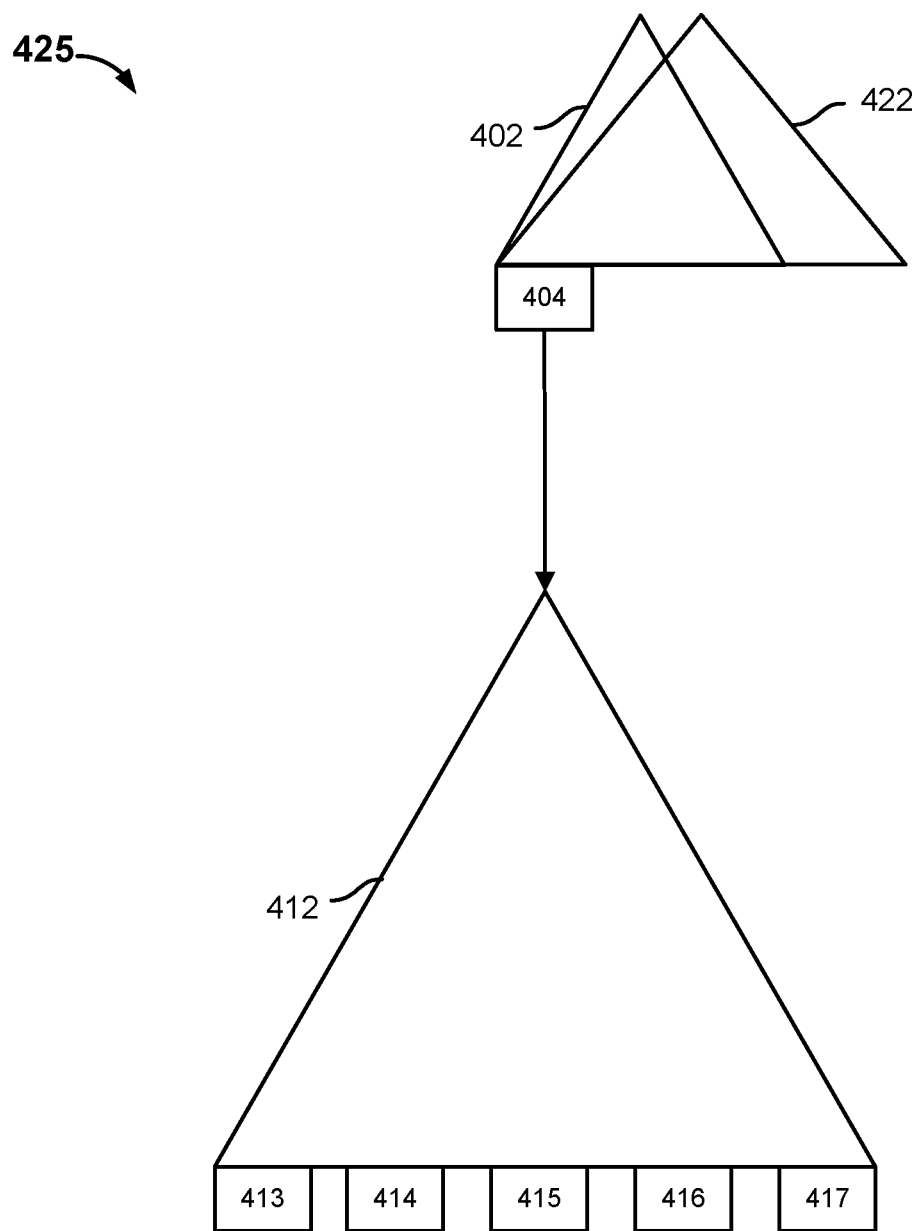
FIG. 4B is a diagram illustrating an embodiment of a view of file system data.

FIG. 4B is a diagram illustrating an embodiment of a view of file system data. In the example shown, file system data view 425 may be generated by a file system manager, such as file system manager 117.

File system data view 425 may correspond to a cloned view of file system data. A cloned view of file system data may be generated when a backup snapshot is received at a secondary storage system from a primary system. In other embodiments, a cloned view of file system data may be generated when a database is mounted on a secondary storage system. In other embodiments, a cloned view of file system data may be generated after a portion of or the entire set of database files has been migrated to a server.

File system data view 425 includes file system metadata snapshot tree 422 and file metadata tree 412. File system metadata snapshot tree 402 is shown for explanation purposes. File system metadata snapshot tree 422 may include a root node that is a copy of the root node of file system metadata snapshot tree 402, that is, the root node of file system metadata snapshot tree 422 includes the same set of pointers as the root node of file system metadata snapshot tree 402, but includes a different node identifier and a different backup snapshot/view identifier. Snapshot trees 402, 422 both include leaf node 404. Leaf node 404 includes a pointer to a root node of file metadata tree 412.

Figure 4C:
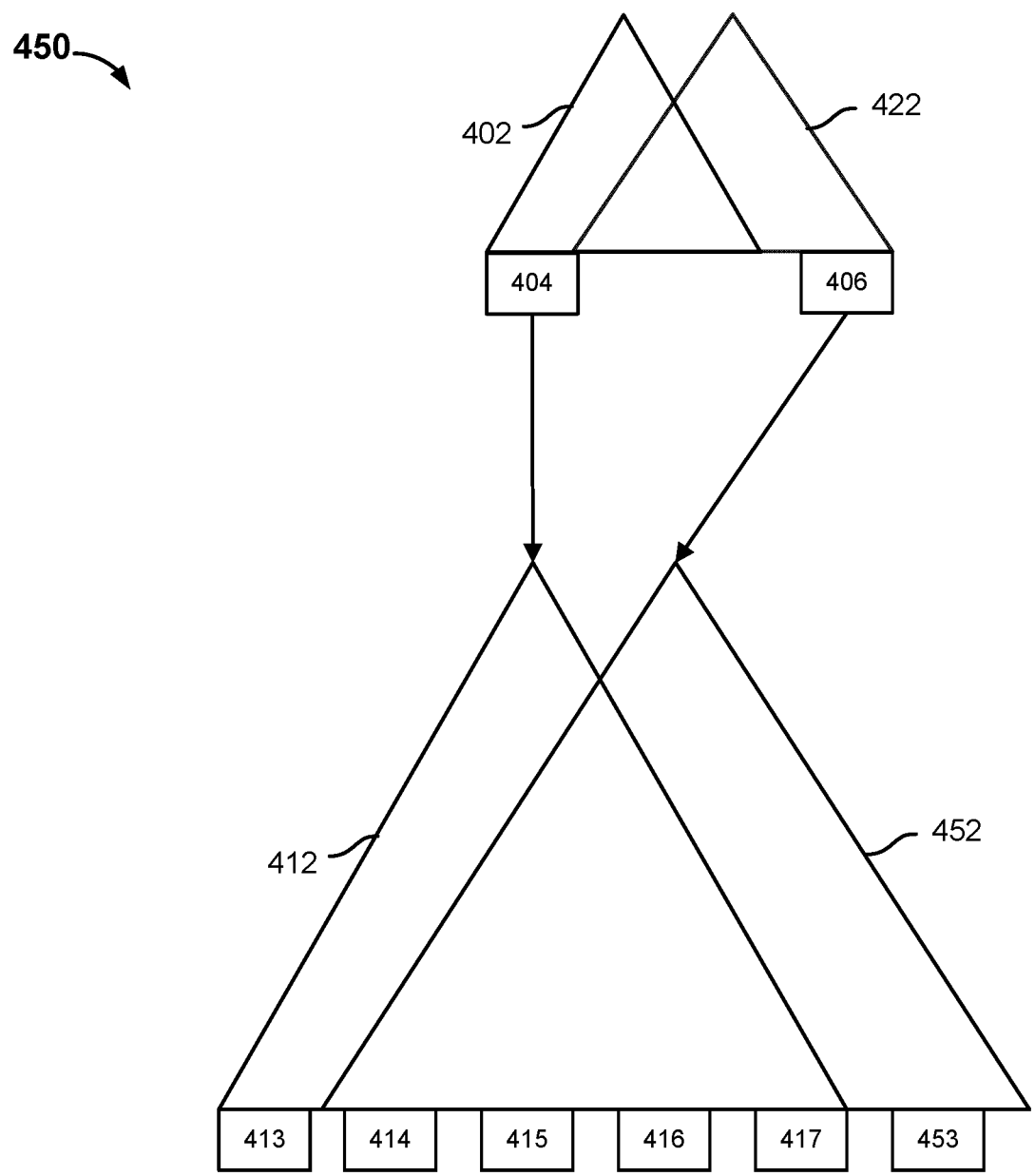
FIG. 4C is a diagram illustrating an embodiment of a view of file system data.

FIG. 4C is a diagram illustrating an embodiment of a view of file system data. In the example shown, file system data view 450 may be generated by a file system manager, such as file system manager 117.

File system data view 450 may correspond to a current view of file system data and is capable of being modified. File system data view 450 may correspond to the one or more changes to the file system data included in an incremental backup snapshot. In other embodiments, file system data view 450 may correspond to the one or more changes to a database file included in a mounted database.

File system data view 450 includes file system metadata snapshot tree 422 and file metadata tree 452. File system metadata snapshot tree 422 includes one or more nodes that are shared with file system metadata snapshot tree 402. In the example shown, file system metadata snapshot tree 422 includes leaf node 406, which is a leaf node not shared with file system metadata snapshot tree 402. Leaf node 406 includes a pointer to a root node of file metadata tree 452. File system metadata snapshot tree 422 may include other leaf nodes that are not shown for explanation purposes. The other leaf nodes may include pointers to other corresponding file metadata trees.

File metadata tree 452 is configured to store the metadata associated with a second version of the content file. For example, file metadata tree 452 may be configured to store the metadata associated with a second version of a database file. File metadata tree 452 includes leaf nodes 414, 415, 416, 417, 453. Some of the data associated with the content file corresponding to file metadata tree 452 has not changed since the last backup snapshot. In this example, the data associated with leaf nodes 414, 415, 416, 417 has not changed since the first backup snapshot. The data associated with leaf node 453 has been added in the second version of the content file.

In other embodiments, the data associated with leaf nodes 414, 415, 416, 417 has not changed since a live migration of the data associated with the content file has started. The data associated with leaf node 453 has been added in the second version of the content file while the first version of the content file was being migrated.

Leaf node 453 is associated with data that was not included in a first version of the content file. Leaf node 453 may be determined to be associated with a second version of the content file by traversing the file system metadata snapshot tree associated with the second version of the content file. File system metadata snapshot tree 422 is the file system metadata snapshot tree associated with the second version of the content file.

File system metadata snapshot tree 422 may be traversed to leaf node 406, which includes a pointer to the root node of file metadata tree 452. File metadata tree 452 may be traversed to each of the leaf nodes. Each leaf node of file metadata tree 452 has an associated view identifier. In the event the view identifier associated with a leaf node matches the view identifier associated with the root node of the file metadata tree, the data associated with the leaf node is determined to be associated with the second version of the content file, that is, the data was added to the content file after a previous backup snapshot or the data was added to the content file after a previous version of the content file was being migrated. In some embodiments, the file corresponding to file metadata tree 452 has been modified by replacing the one or more data chunks associated with leaf node 413 with the one or more data chunks associated with leaf node 453. In some embodiments, the one or more data chunks associated with leaf node 413 have been modified to mask the data included in the one or more chunks and the one or more data chunks associated with leaf node 453 store the masked data.

File metadata tree 412 corresponds to a first version of a content file (e.g., database file) and file metadata tree 452 corresponds to a second version of the content file. File metadata tree 452 includes one or more leaf nodes that were not included in file metadata tree 412. The one or more leaf nodes that were not included in file metadata tree are associated with data that is included in the second version of the content file, but not included in the first version of the content file. The data that is included in the second version of the content file, but not included in the first version of the content file has an associated size. The associated size may be compared to a downtime threshold. In the event the associated size is less than the downtime threshold, a database application may be quiesced and the data that is included in the second version of the content file, but not included in the first version of the content file may be migrated from the secondary storage system to a server hosting the database application.

Figure 4D:
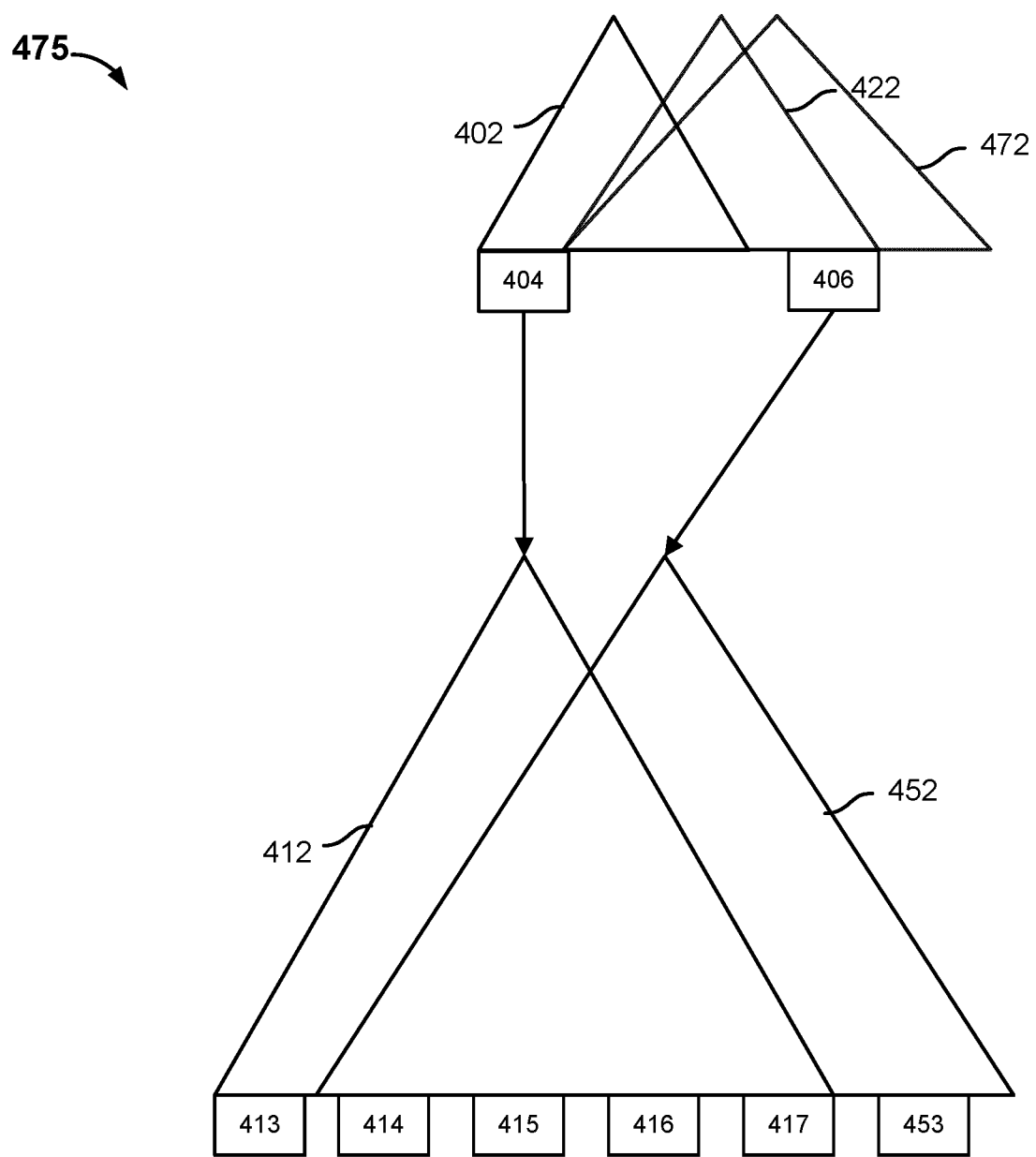
FIG. 4D is a diagram illustrating an embodiment of a view of file system data.

FIG. 4D is a diagram illustrating an embodiment of a view of file system data. In the example shown, file system data view 475 may be generated by a file system manager, such as file system manager 117.

File system data view 475 may correspond to a cloned view of file system data. A cloned view of file system data may be generated when a backup snapshot is received at a secondary storage system from a primary system. In other embodiments, a cloned view of file system data may be generated when a database is mounted on a secondary storage system. In other embodiments, a cloned view of file system data may be generated after a portion of or the entire set of database files has been migrated to a server.

File system data view 475 includes file system metadata snapshot tree 472 and file metadata tree 452. File system metadata snapshot trees 402, 422 are shown for explanation purposes. File system metadata snapshot tree 472 may include a root node that is a copy of the root node of file system metadata snapshot tree 422, that is, the root node of file system metadata snapshot tree 472 includes the same set of pointers as the root node of file system metadata snapshot tree 402, but includes a different node identifier and a different backup snapshot/view identifier. File system metadata snapshot trees 422, 472 both include leaf node 406. Leaf node 406 includes a pointer to a root node of file metadata tree 452.

The data associated with a cloned view of file system data may migrated from a secondary storage system to an external server. In some embodiments, a partial migration may be performed. The partial migration may include data associated with one or more selected files (e.g., database files). The cloned view of file system data may include one or more file metadata trees corresponding to the one or more selected files. The cloned view of file system data may be traversed to locate the data associated with the one or more selected files and the located data may be migrated.

In other embodiments, a full migration may be performed. The cloned view of file system data may include one or more file metadata trees corresponding to one or more files (e.g., database files). The cloned view of file system data may be traversed to locate the data associated with the one or more files and the located data may be migrated.

Figure 5:
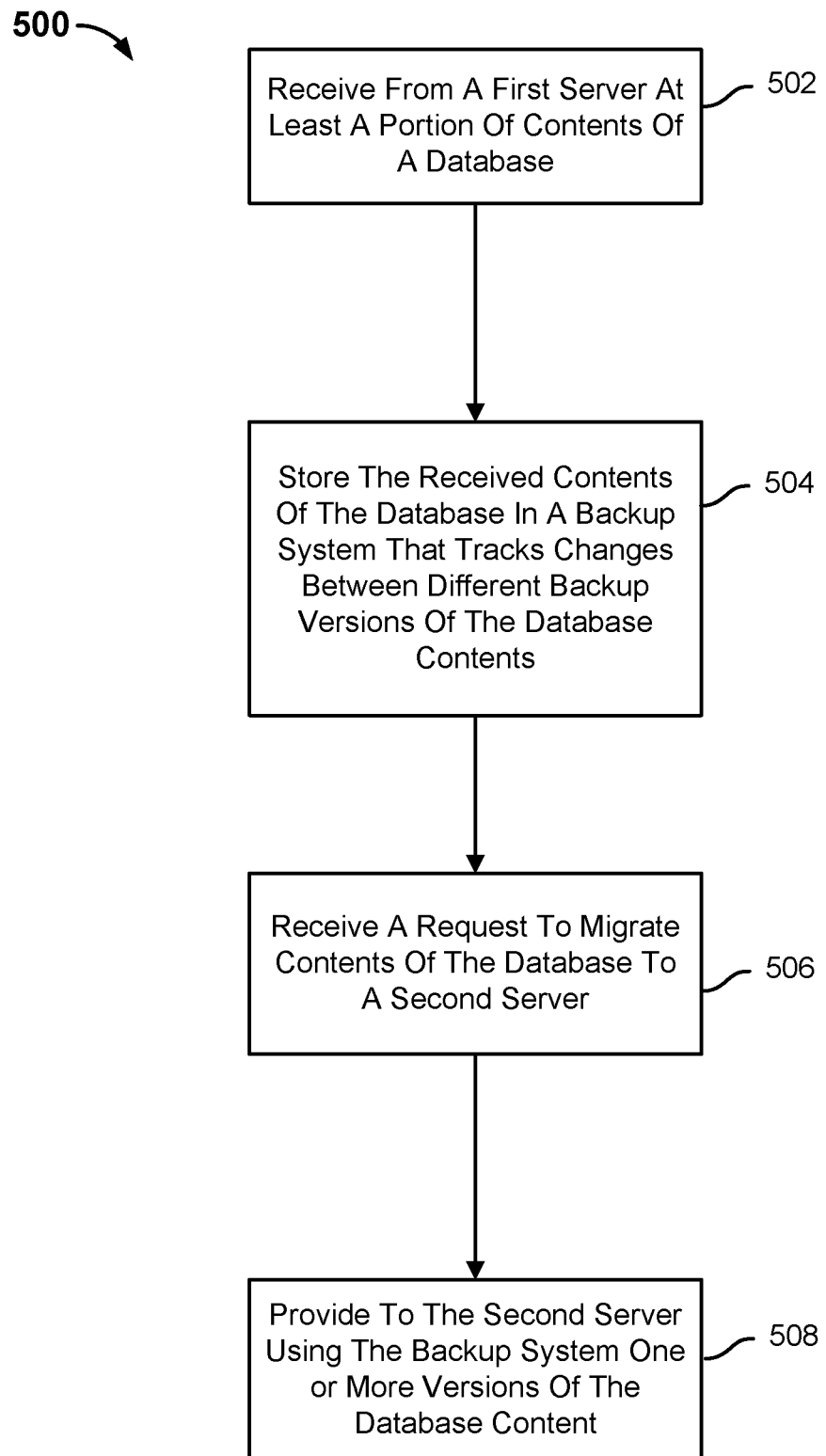
FIG. 5 is a flow chart illustrating a process for migrating database content in accordance with some embodiments.

FIG. 5 is a flow chart illustrating a process for migrating database content in accordance with some embodiments. In the example shown, process 500 may be implemented by a storage system, such as secondary storage system 112.

At 502, at least a portion of contents of a database is received from a first server. A first server may act as a primary system and include a database. The primary system may store data associated with the database in one or more database files. The one or more database files may include a primary database file, a log file, a tablespace, a datafile, a control file, etc. A storage system, such as a secondary storage system, may cause the primary system to perform a backup snapshot and store the backup snapshot to the secondary storage system.

A backup snapshot represents the state of the primary system at a particular point in time (e.g., the state of the file system data). The backup snapshot may include data of the one or more database files. The backup snapshot may be a full backup snapshot or an incremental backup snapshot. A full backup snapshot stores the entire state of the primary system at the particular point in time and includes all of the contents associated with a database (e.g., all of the one or more database files). An incremental backup snapshot includes the data associated with the primary system that was not backed up in a previous backup snapshot and may include a portion of the database contents (e.g., the data associated with the one or more database files) that was not backed up in a previous backup snapshot.

At 504, the received contents of the database are stored in a backup system that tracks changes between different backup versions of the database contents. A secondary storage system may ingest and store the file system data of the backup snapshot. A file system manager of the secondary storage system may organize the file system data of the backup snapshot using a tree data structure. The tree data structure provides a view of the file system data corresponding to a backup snapshot. The view of the file system data corresponding to the backup snapshot is comprised of a file system metadata snapshot tree and one or more file metadata trees.

A file system metadata snapshot tree is a representation of a fully hydrated backup because it provides a complete view of the primary system at a particular moment in time. A fully hydrated backup is a backup that is ready for use without having to reconstruct a plurality of backups to use it. Any file stored on the primary system at a particular time and the file's contents, for which there is an associated backup snapshot, may be determined from the file system metadata snapshot tree, regardless if the associated backup snapshot was a full backup snapshot or an incremental backup snapshot. For example, an incremental backup snapshot of a primary system may only include data of the primary system that was not previously backed up. However, a file system metadata snapshot tree corresponding to an incremental backup snapshot provides a complete view of the primary system at the particular moment in time because it includes references to data of the primary system that was previously backed up. For example, a root node associated with the file system metadata snapshot tree may include one or more references to nodes associated with one or more previous backup snapshots and one or more references to nodes associated with the current backup snapshot.

A file metadata tree is a snapshot structure that stores the metadata associated with a file and may correspond to one of the files included in the backup snapshot. For example, a file metadata tree may correspond to one of the database files. The file metadata tree can be used to capture different versions of the file (e.g., different versions of a database file) at different moments in time. In some embodiments, the tree data structure allows a chain of file metadata trees corresponding to different versions of a file to be linked together by allowing a node of a later version of a file metadata tree to reference a node of a previous version of a file metadata tree. A file metadata tree is comprised of a root node, one or more levels of one or more intermediate nodes, and one or more leaf nodes. A root node or an intermediate node of a version of a file metadata tree may reference an intermediate node or a leaf node of a previous version of a file metadata tree. When a backup snapshot is received, a root node of the file metadata tree may be linked to one or more intermediate nodes associated with a previous file metadata tree.

At 506, a request to migrate contents of the database to a second server is received. The second server may host an instance of a database application. A user associated with the second server may request to migrate contents of the database to the second server for one or more reasons.

In some embodiments, a user associated with the second server may desire to use production quality data for testing/development purposes. The secondary storage system may be used to migrate the database content instead of the primary system hosting an instance of the database application to free up system resources of the primary system for other purposes, such as to respond to one or more database requests. In other embodiments, the first server hosting an instance of the database may go offline and the one or more database files may be migrated to the second server. The secondary storage system may be used to migrate the database content instead of the primary system hosting the instance of database application because the primary system is offline and unable to migrate the database content.

One problem with migrating database content to the second server is the amount of downtime associated with the migration. The one or more database files may be quite large (e.g., 10 TBs) and migrating such large files may require a long period of time to perform (e.g., 10 hours). The migrated database content stored on the second server should be consistent with the database content stored at the secondary storage system before a user associated with the second server has access to the data. However, the user associated the second server may desire to have instant access to the database content.

Instantaneous or near-instantaneous access to the database content stored on the secondary storage system may be provided by instantiating a new version of the database content at the secondary storage system. Instantiating the new version of the database content may include cloning a view corresponding to a backup snapshot that includes a version of the desired database content. A user with access to the data associated with a view corresponding to a backup snapshot may have read/write privileges. The view corresponding to the backup snapshot that includes the version of the desired database content is cloned to prevent the user associated with the second server from modifying the backup snapshot that represents the state of the primary system at a particular moment in time. The database application on the second server may be quiesced for a brief period of time while the view corresponding to the backup snapshot is being cloned. This is to prevent the view corresponding to the backup snapshot and the cloned view of the view corresponding to the backup snapshot from being inconsistent with each other. The cloned view is a fully hydrated backup and includes access to the database content. Instantiating the new version of the database content may further include mounting the database content associated with the cloned view. The second server may be provided with remote access (e.g., read/write access) to the mounted database. The second server may be able to modify the data included in the mounted database as if the data was stored locally on the second server. For example, one or more masking techniques may be applied to the data included in the mounted database to obscure an identity associated with the data. Mounting the database and providing remote access may provide the user associated with the second server instantaneous or near-instantaneous access to the database content stored on the secondary storage system.

At 508, one or more versions of the database content are provided to the second server using the backup system. The second server may include an instance of a database application. A user associated with the second server may use the database application to make one or more database requests (read/write) to the mounted database. However, the input/output operations per second (IOPS) associated with such remote access may be sufficient in the short term, but unacceptable as a long term solution. For example, the IOPS associated with remote access may be between 10-15 milliseconds (ms). In contrast, the TOPS associated with local access may be around 1 ms. The one or more database calls may take longer to perform than if the data associated with the one or more database files was locally stored on the second server. However, it may take a long period of time (e.g., 10 hours) to migrate the data associated with the one or more database files. The data included in the mounted database may be migrated in the background (e.g., live migration) from the secondary storage system to the second server while the user associated with the second server has access to the mounted database.

In some embodiments, a portion of the database content is migrated in the background from the secondary storage system to the second server while a user associated with the second server has access to the mounted database. For example, the user associated with the second server may only need access to a subset of the database content. The user associated with the second server may need access to a particular version of a tablespace or a particular version of a schema. The one or more files associated with the particular version of the tablespace (e.g., files that are member of the tablespace) or the particular version of the schema, instead of the entire database, may be migrated from the secondary storage system to the new server. In some embodiments, a view that includes the particular version of the tablespace and/or particular version of the schema is cloned, the cloned view is traversed to locate the data associated with the particular version of the tablespace and/or the particular version of the schema and the data of the one or more files associated with the particular version of the tablespace and/or the particular version of the schema, and the located data is migrated from the secondary storage system to the second server. In other embodiments, a view that includes the particular version of the tablespace and/or particular version of the schema is cloned, one or more modifications (e.g., masking) may be made to the data associated with the cloned view, the view associated with the modified data is cloned, the cloned view is traversed to locate the data associated with the particular version of the tablespace and/or the particular version of the schema and the data of the one or more files associated with the particular version of the tablespace and/or the particular version of the schema, and the located data is migrated from the secondary storage system to the second server. The database application hosted on the second server may keep track of one or more changes to the subset of database content while the subset of database content is being migrated from the secondary storage system to the second server and apply the one or more tracked changes to the subset of database content after the subset of database content is migrated to the second server.

The one or more files included in the subset of the database content may be migrated based on a corresponding priority associated with the one or more files. The priority associated with the one or more files may be based on a migration policy. For example, a migration policy may indicate that a frequently used file (e.g., accessed more than a threshold number of times within a threshold period) may be migrated at the outset and one or more files that are not frequently used (e.g., access less than a threshold number of times within a threshold period) may be migrated after one or more files with a higher priority are migrated.

In other embodiments, the entire database content is migrated in the background from the secondary storage to the second server while a user associated with the second server is accessing the mounted database. A first version of the database content is migrated from the secondary storage system to the second server. After the initial migration instance of the database content is completed, the data in the mounted database may be inconsistent with the database content stored on the second server because the user associated with the second server has made one or more modifications to the data included in the mounted database. The secondary storage system may clone a view associated with the mounted database. The database application on the second server may be quiesced for a brief period of time while the view corresponding to the mounted database is being cloned. The cloned view associated with the mounted database may be traversed to identify the data that was added or modified to the mounted database during the initial migration. The secondary storage system may determine the amount of time needed to migrate the identified data. The amount of time needed to migrate the identified data is compared to a downtime threshold. In some embodiments, the amount of time needed to migrate the identified data is less than the downtime threshold (e.g., 30 seconds), the database application hosted on the second server is quiesced and the identified data is migrated to the second server. In other embodiments, the amount of time needed to migrate the identified data is not less than the downtime threshold, a view associated with the mounted database is cloned, and the identified data is migrated in the background while the user associated with the second server continues to access and use the mounted database.

Each time a data migration instance is completed, the data included in the mounted database may be inconsistent with the database content stored on the second server. An amount of time needed to migrate data to make the data included in the mounted database consistent with the database content stored on the second server is computed. The process described above may be repeated until the amount of time needed to migrate the data to make the data included in the mounted database consistent with the database content stored on the second server is less than the downtime threshold. The amount of time needed to migrate data to make the data included in the mounted database consistent with the database content stored on the second server reduces each time a data migration is completed. At some point in time, the amount of time needed to migrate the data to make the data included in the mounted database consistent with the database content stored on the second server is less than a downtime threshold. In the event the amount of time needed to migrate the data to make the data included in the mounted database consistent with the database content stored on the second server is less than the downtime threshold, the database application hosted on the second server is quiesced and the data to make the data included in the mounted database consistent with the database content stored on the second server is migrated to the second server.

Regardless of whether a partial or full database migration is performed, the user associated with the second server is provided with instantaneous or near-instantaneous access to the data associated with a database without a significant amount of downtime. In addition to reducing the amount of downtime, the TOPS performance is improved over time as database content is migrated in the background from the secondary storage system to the second server while the user associated with the second server is accessing the mounted database.

Figure 6:
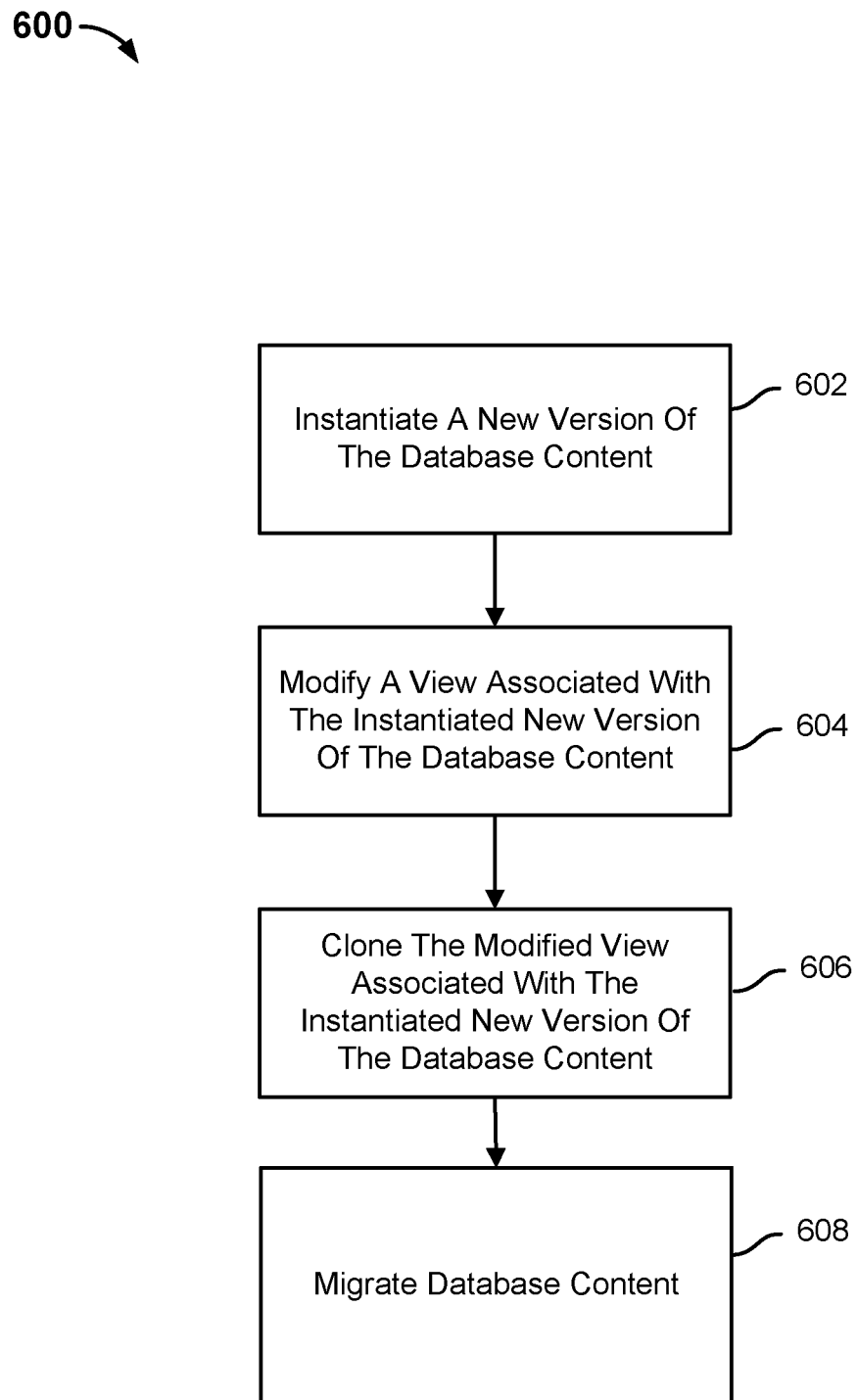
FIG. 6 is a flow chart illustrating a process for migrating database content in accordance with some embodiments.

FIG. 6 is a flow chart illustrating a process for migrating database content in accordance with some embodiments. In the example shown, process 600 may be implemented by a storage system, such as secondary storage system 112. In some embodiments, process 600 may be implemented to perform a portion of or all of step 508 of process 500.

At 602, a new version of the database content is instantiated. Instantiating the new version of the database content may include cloning a view of file system data associated with a version of database content. A view of file system data corresponds to a particular backup snapshot. One of the backup snapshots includes the data associated with the version of database content. Cloning a view corresponding to a backup snapshot that includes the version of database content includes copying a root node associated with a view. The root node copy includes the same set of pointers as the copied root node, but may include a different node identifier and a different view identifier. The cloned view has access to the same data as the view that was cloned. A database application with access to the data associated with the cloned view may be quiesced for a brief period of time while the view of file system data associated with a version of database content is being cloned.

Instantiating the new version of the database content may further include mounting a database based on data associated with the cloned view. A server may be provided with access to the mounted database. The server may be able to modify the data included in the mounted database as if the data was stored locally on the server. For example, one or more masking techniques may be applied to the data included in the mounted database to obscure an identity associated with the data.

At 604, a view associated with the instantiated new version of the database content is modified. The cloned view may be modified based on one or more modifications to the mounted database. A user associated with the server may make one or more modifications to the data included in the mounted database. One or more modifications to the cloned view corresponding to the one or more modifications to the data included in the mounted database may be performed. For example, the user associated with the server may obscure the identities of people associated with a tablespace or schema. The cloned view may be modified to include references to the obscured identities (e.g., "Individual 1") instead of including references to the actual identities (e.g., "John Smith").

At 606, the modified view associated with the instantiated new version of the database content is cloned. The modified cloned view may be cloned. Cloning the modified cloned view includes copying a root node associated with the modified cloned view. The root node copy includes the same set of pointers as the copied root node, but may include a different node identifier and a different view identifier. The clone of the modified cloned view has access to the same data as the modified cloned view. In some embodiments, the data associated with the clone of the modified cloned view is mounted and a user associated with the server has access to the mounted data.

At 608, database content is migrated. In some embodiments, a partial migration is performed. For example, one or more selected data application files associated with the clone of the modified cloned view is migrated to the server. In other embodiments, a full migration is performed. For example, all of the data application files associated with the clone of the modified cloned view is migrated to the server.

Figure 7:
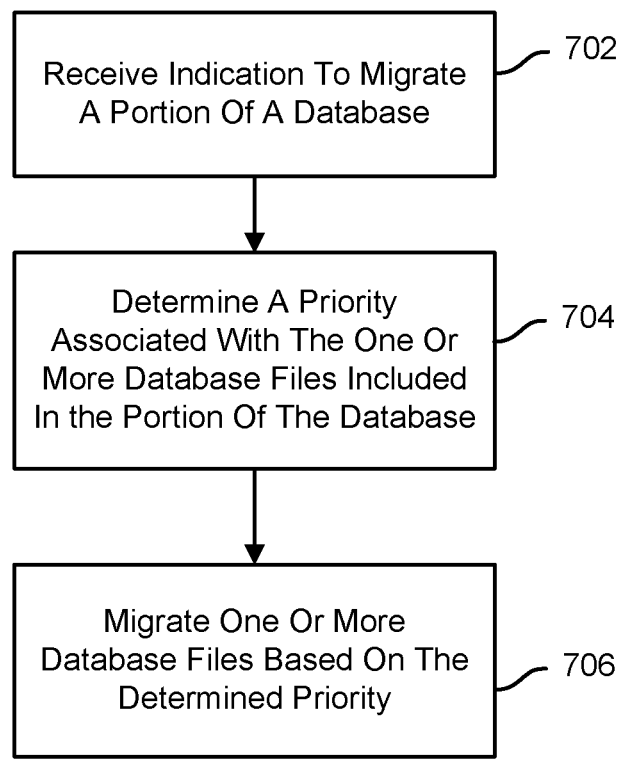
FIG. 7 is a flow chart illustrating a process for a partial migration of database content in accordance with some embodiments.

FIG. 7 is a flow chart illustrating a process for a partial migration of database content in accordance with some embodiments. In the example shown, process 700 may be implemented by a storage system, such as secondary storage system 112. In some embodiments, process 700 may be implemented to perform a portion of or all of step 508 of process 500. In other embodiments, process 700 may be implemented to perform a portion of or all of step 608 of process 600.

At 702, an indication to migrate a portion of a database is received. A user associated with a server may select the one or more database files to migrate from a secondary storage system to the server. For example, the user associated with the server may need access to a particular version of the tablespace or a particular version of the schema and select to migrate the particular version of the tablespace and/or the particular version of the schema and the one or more files associated with the particular version of the tablespace and/or the particular version of the schema. In some embodiments, the user associated with a server selects a particular version of a tablespace and/or a particular schema and the secondary storage system determines the one or more files associated with the particular version of the tablespace and/or the particular version of the schema.

At 704, a priority associated with the one or more database files included in the portion of the database is determined. The one or more files included in the subset of the database content may be migrated based on a corresponding priority associated with the one or more files. The priority associated with the one or more files may be based on a migration policy. For example, a migration policy may indicate that a frequently used file (e.g., accessed more than a threshold number of times within a threshold period) may be migrated at the outset and one or more files that are not frequently used (e.g., access less than a threshold number of times within a threshold period) may be migrated after one or more files with a higher priority are migrated. A secondary storage system may monitor and keep track of the number of times a particular file is accessed.

At 706, the one or more database files are migrated based on the determined priority.

Figure 8:
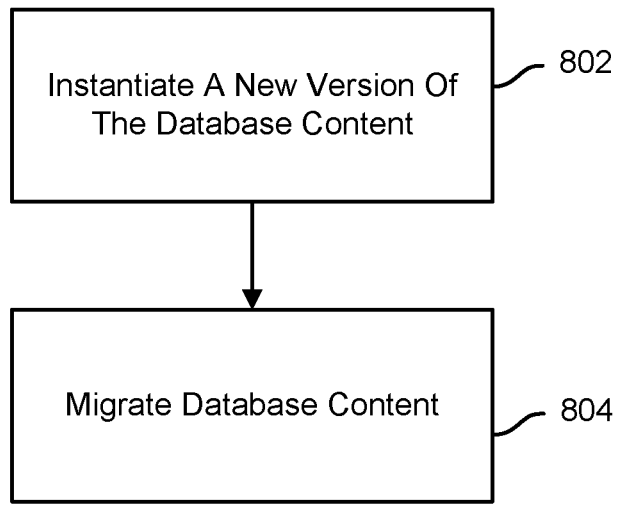
FIG. 8 is a flow chart illustrating a process for a complete migration of database content in accordance with some embodiments.

FIG. 8 is a flow chart illustrating a process for a complete migration of database content in accordance with some embodiments. In the example shown, process 800 may be implemented by a storage system, such as secondary storage system 112. In some embodiments, process 800 may be implemented to perform a portion of or all of step 508 of process 500.

At 802, a new version of the database content is instantiated. Instantiating the new version of the database content may include cloning a view of file system data associated with a version of database content. A view of file system data corresponds to a particular backup snapshot. One of the backup snapshots includes the data associated with the version of database content. Cloning a view corresponding to a backup snapshot that includes the version of database content includes copying a root node associated with a view. The root node copy includes the same set of pointers as the copied root node, but may include a different node identifier and a different view identifier. The cloned view has access to the same data as the view that was cloned. A database application with access to the data associated with the cloned view may be quiesced for a brief period of time while the view of file system data associated with a version of database content is being cloned.

Instantiating the new version of the database content may further include mounting a database based on data associated with the cloned view. A server may be provided with access to the mounted database. The server may be able to modify the data included in the mounted database as if the data was stored locally on the server. For example, one or more masking techniques may be applied to the data included in the mounted database to obscure an identity associated with the data.

At 804, the database content is migrated. A first version of the entire database content is migrated in the background from the secondary storage system to the server while a user associated with the server is accessing the mounted database. After the initial migration of the database content is completed, the data in the mounted database may be inconsistent with the database content stored on the server because the user associated with the server has made one or more modifications to the data included in the mounted database. The cloned view associated with the mounted database may be traversed to identify the data that was added or modified to the mounted database during the initial migration. The secondary storage system may determine the amount of time needed to migrate the identified data. The amount of time needed to migrate the identified data is compared to a downtime threshold. In some embodiments, the amount of time needed to migrate the identified data is less than the downtime threshold (e.g., 30 seconds), the database application hosted on the server is quiesced and the identified data is migrated to the server. In other embodiments, the amount of time needed to migrate the identified data is not less than the downtime threshold, a view associated with the mounted database is cloned, and the identified data is migrated in the background while the user associated with the server continues to access and use the mounted database. The database application on the server may be quiesced for a brief period of time while the view of file system data associated with a version of database content is being cloned.

Each time a data migration instance is completed, the data included in the mounted database may be inconsistent with the database content stored on the server. An amount of time needed to migrate data to make the data included in the mounted database consistent with the database content stored on the server is computed. The process described above may be repeated until the amount of time needed to migrate the data to make the data included in the mounted database consistent with the database content stored on the server is less than the downtime threshold. The amount of time needed to migrate data to make the data included in the mounted database consistent with the database content stored on the server reduces each time a data migration is completed. At some point in time, the amount of time needed to migrate the data to make the data included in the mounted database consistent with the database content stored on the server is less than a downtime threshold. In the event the amount of time needed to migrate the data to make the data included in the mounted database consistent with the database content stored on the server is less than the downtime threshold, the database application hosted on the server is quiesced and the data to make the data included in the mounted database consistent with the database content stored on the server is migrated to the server.

Figure 9:
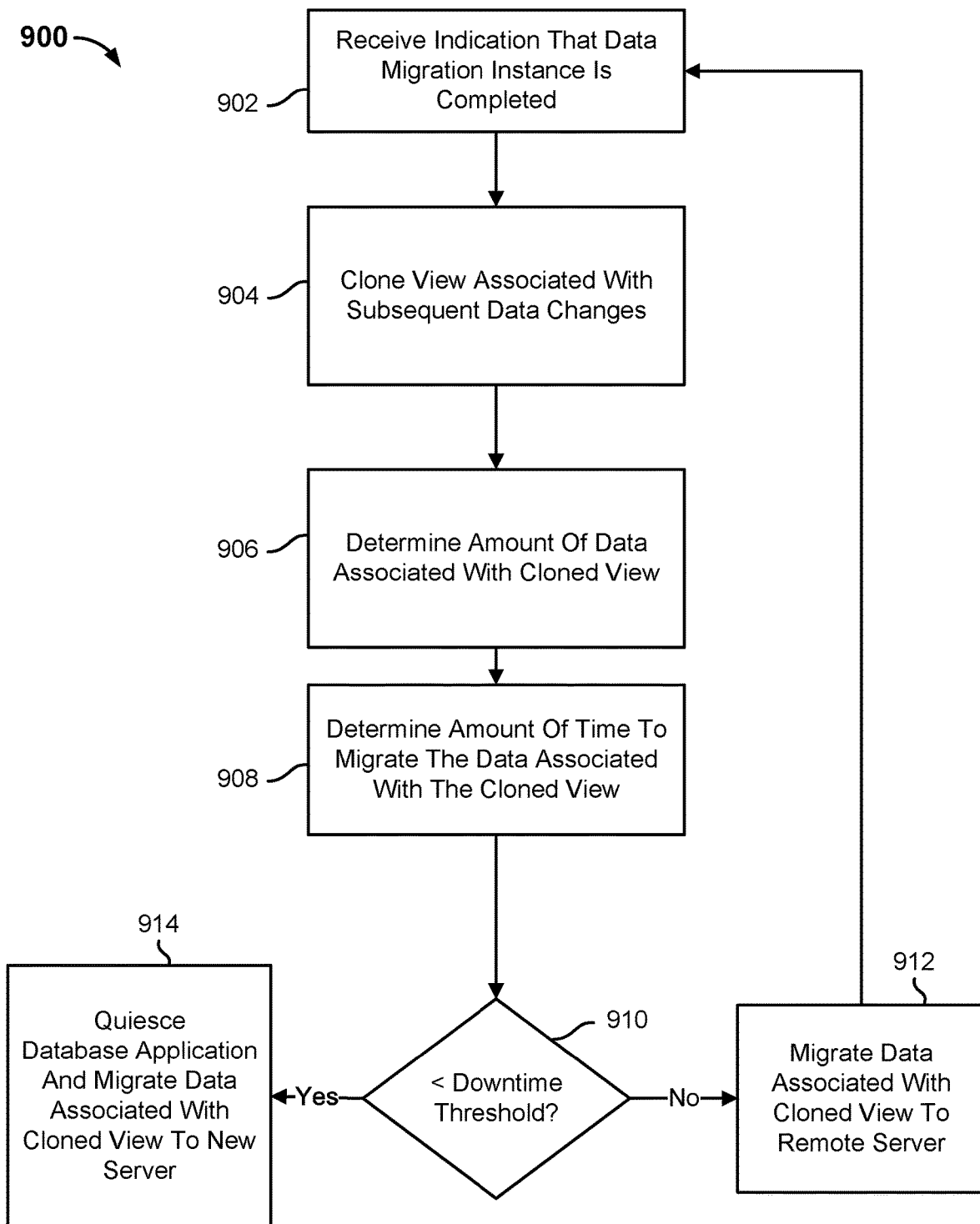
FIG. 9 is a flow chart illustrating a process for a complete migration of database content in accordance with some embodiments.

FIG. 9 is a flow chart illustrating a process for a complete migration of database content in accordance with some embodiments. In the example shown, process 900 may be implemented by a storage system, such as secondary storage system 112. In some embodiments, process 900 may be implemented to perform a portion of or all of step 806 of process 800.

At 902, an indication that an instance of data migration is completed is received. In some embodiments, a server may provide the indication to a secondary storage system that was performing the data migration instance. In other embodiments, a data migration module of the secondary storage system may provide an indication that the data migration instance is complete to one or more processors of the secondary storage system.

At 904, a view associated with one or more subsequent data changes is cloned. A user associated with a server may make one or more modifications to the data included in the mounted database while a data migration is being performed. One or more modifications to the view corresponding to the one or more modifications to the data included in the mounted database may be performed. For example, the user associated with the remote server may obscure the identities of people associated with a tablespace or schema. The view associated with the one or more subsequent data changes may be modified to include references to the obscured identities (e.g., "Individual 1") instead of including references to the actual identities (e.g., "John Smith").

Cloning a view associated with one or more subsequent data changes includes copying a root node associated with a previous view. The root node copy includes the same set of pointers as the copied root node, but may include a different node identifier and a different view identifier. The cloned view has access to the same data as the view corresponding to the view that was cloned. The database application on the server may be quiesced for a brief period of time while the view is being cloned.

At 906, an amount of data associated with the cloned view is determined. An amount of data associated with one or more subsequent modifications to the data is determined. After the data migration is completed, the data included in the mounted database may be inconsistent with the database content stored on the server. The amount of data associated with the cloned view may be determined by traversing the cloned view and identifying data that is not included in one or more previous views. A root node of the cloned view has a particular view identifier. The cloned view may be traversed to the leaf nodes of the one or more file metadata tree corresponding to database content and comparing the view identifier associated with a leaf node of a file metadata tree with the view identifier of the root node of the cloned view. In the event the view identifier associated with a leaf node of a file metadata tree is the same as the view identifier of the root node of the cloned view, the data associated with that leaf node was not included in one or more previous views. In the event the view identifier associated with a leaf node of a file metadata tree is different than the view identifier of the root node of the cloned view, the data associated with that leaf node was included in one or more previous views (i.e., that data was already migrated).

At 908, an amount of time to migrate the data associated with the cloned view is determined. In some embodiments, the secondary storage system may provide to the database application associated with the server an estimated amount of time to migrate a remaining portion of the one or more database files.

At 910, it is determined whether the amount of time to migrate the data associated with the cloned view is less than a downtime threshold.

In some embodiments, the database application hosted on the server may provide to the user associated with the server an option to quiesce the database application and migrate the remaining portion from the secondary storage system to the server. The user may decline to quiesce the database application because the amount of downtime associated with the database application is too long. For example, it may take an hour to migrate the remaining portion of the database content. In the event the user associated with the server declines to quiesce the database application and migrate the remaining portion of the database content, process 900 proceeds to 912. In the event the user associated with the server agrees to quiesce the database application and migrate the remaining portion of the database content, process 900 proceeds to 914.

In other embodiments, the database application hosted on the server is automatically quiesced and the remaining portion of the one or more database files is migrated from the secondary storage system to the server in the event the amount of downtime associated with the data migration is less than a downtime threshold (e.g., 1 minute). The downtime threshold may be specified by a user associated with the server. In the event the amount of downtime associated with the data migration is not less than a downtime threshold, process 900 proceeds to 912. In the event the amount of downtime associated with the data migration is less than a downtime threshold, process 900 proceeds to 914.

At 912, the data associated with the cloned view is migrated to the server. The secondary storage system may be configured to migrate the remaining portion of the database content and the user associated with the server may continue to use the database application and have access to the mounted database while the remaining portion of the database content is being migrated in the background from the secondary storage system to the server.

At 914, the database application hosted on the server is quiesced and the data associated with the cloned view is migrated to the server. In some embodiments, in the event the user associated with the server agrees to quiesce the database application and migrate the remaining portion of the database content (e.g., the amount of downtime is not too long), the database application is quiesced and the secondary storage system migrates the remaining portion of the database content to the server. The user of the database application hosted on the server may decide that the amount of downtime is acceptable.

In other embodiments, the database application hosted on the remote server is automatically quiesced and the remaining portion of the database content is migrated from the secondary storage system to the server in the event the amount of downtime associated with the data migrate is less than a downtime threshold (e.g., 1 minute).

Each time the remaining portion of the database content is migrated and the user associated with the server continues to use the database application, the amount of downtime associated with the next migration instance may decrease. For example, it may take 10 hours to perform an initial migration instance that includes the initial portion of the database content, a hour to perform a second migration instance that includes a first remaining portion of the database content, thirty minutes to perform a third migration instance that includes a second remaining portion of the database content, . . . , and less than a minute to perform an nth migration instance to migration an (n−1)th remaining portion of the one or more database files. The technique to migrate database content not only reduces the amount of downtime associated with a database application, but also ensures that the database content stored on the secondary storage system and the database content stored on the server are in sync with each other before the user associated with the server has complete local access to the database content.

Figure 10:
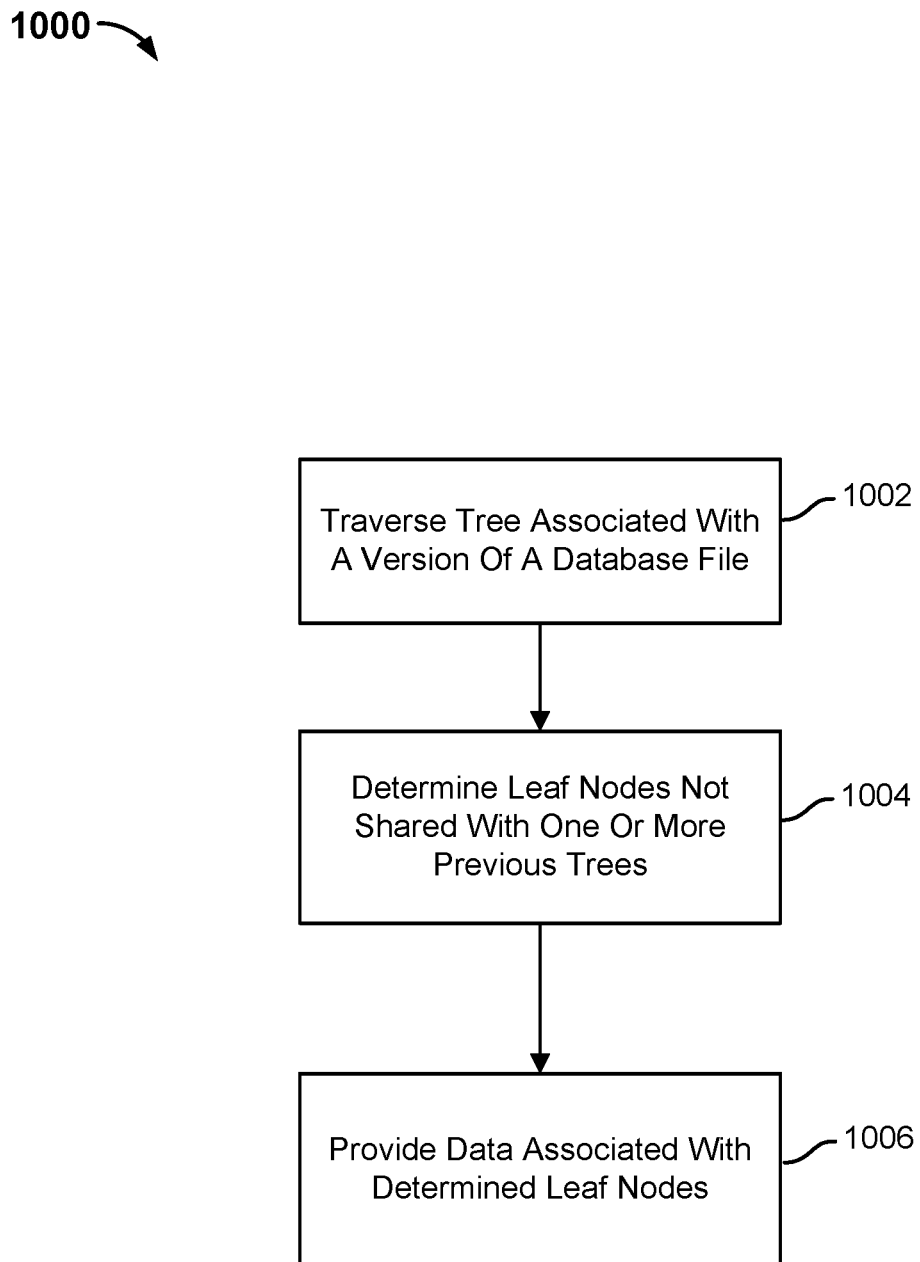
FIG. 10 is a flow chart illustrating a process for determining changes associated with a database file in accordance with some embodiments.

FIG. 10 is a flow chart illustrating a process for determining changes associated with a database file in accordance with some embodiments. In the example shown, process 1000 may be implemented by a storage system, such as secondary storage system 112. In some embodiments, process 1000 may be implemented to perform a portion of step 508 of process 500, a portion of step 608 of process 600, or a portion of step 806 of process 800.

At 1002, a tree associated with a version of a database file is traversed. The tree associated with the version of a database file may be traversed to determine data associated with the database file that was not previously backed up in a previous backup snapshot. A tree associated with the version of a database file has a particular root node. The particular root node has an associated view identifier. The view identifier is associated with a particular backup snapshot. The tree associated with the version of a database file is traversed to identify nodes of the tree that have the same view identifier as the root node associated with the version of a database file.

At 1004, one or more leaf nodes not shared with one or more previous trees are determined. The one or more leaf nodes not shared with one or more previous trees are the one or more leaf nodes that have the same view identifier as the root node of the tree associated with the version of a database file. The one or more leaf nodes not shared with one or more previous trees include corresponding references to data bricks. A data brick includes one or more data chunks. The corresponding data bricks included in the one or more leaf nodes not shared with one or more other trees correspond to data that was included in the version of the database file. The one or more data chunks may correspond to data associated with the data application file that was not previously migrated.

At 1006, data associated with the one or more determined leaf nodes is provided. A leaf node of a file metadata tree may include an identifier of a data brick associated with one or more data chunks of the file. A data brick may include one or more data chunks. The location of the data brick may be identified using a data structure (e.g., list, table, etc.) stored in a metadata store that matches data brick identifiers to a physical storage location. In some embodiments, the data structure associates brick identifiers with chunk identifiers (e.g., hashes). The data structure or a different data structure may associate chunk identifiers with a brick offset. A chunk may be associated with a chunk table, which contains a corresponding chunk file ID. The chunk file ID is associated with a chunk file table, which indicates the location of the data (e.g., an offset in a data brick). The data associated with the one or more determined leaf nodes may be identified based on the brick information and provided.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
receiving a request to migrate from a secondary storage system to a server a version of database content that was backed up to the secondary storage system from a primary system;
mounting a database based on the data associated with a cloned view associated with the version of the database content; and
maintaining functionality of the database including by allowing a database application hosted on the server to access the mounted database while migrating the requested version of the database content from the secondary storage system to the server, wherein maintaining functionality of the database further comprises:
modifying the cloned view associated with the version of the database content based on one or more changes made by the database application hosted on the server to the mounted database while a migration instance is being performed;
receiving an indication that the migration instance is completed;
determining an amount of time to migrate from the secondary storage system to the server the data associated with the one or more changes made by the database application hosted on the server to the mounted database; and
finishing a migration of the one or more changes made to the mounted database to the server based on whether the determined amount of time is less than a downtime threshold, wherein finishing the migration of the one or more changes made to the mounted database to the server includes the database application hosted on the server being quiesced and migrating the data associated with the one or more changes made to the mounted database from the secondary storage system to the server after the database application has been quiesced.

2. The method of claim 1, further comprising modifying data included in the mounted database based on one or more commands received from the server.

3. The method of claim 2, further comprising cloning the modified clone view associated with the requested version of the database content, wherein the database application hosted on the server is quiesced while the modified cloned view associated with the requested version of the database content is being cloned.

4. The method of claim 1, wherein migrating the requested version of database content from the secondary storage system to the server includes migrating a subset of the data included in the mounted database.

5. The method of claim 4, wherein the subset of the data included in the mounted database includes data associated with one or more database files selected by a user associated with the server.

6. The method of claim 5, wherein the one or more database files are migrated based on a corresponding priority associated with the one or more database files.

7. The method of claim 1, wherein migrating the requested version of database content from the secondary storage system to the server includes migrating an entire set of the data included in the mounted database.

8. The method of claim 7, wherein the one or more changes to the mounted database are made while the entire set of the data included in the mounted database is being migrated.

9. The method of claim 1, further comprising determining an amount of data associated with the one or more changes made to the mounted database.

10. The method of claim 9, wherein the determined amount of time to migrate is based on the determined amount of data associated with the one or more changes made by the database application hosted on the server to the mounted database.

11. The method of claim 10, further comprising comparing the determined amount of time to the downtime threshold.

12. The method of claim 11, wherein in the event the determined amount of time is less than the downtime threshold, the database application hosted on the server is quiesced and the data associated with the one or more changes made by the database application hosted on the server to the mounted database are migrated from the secondary storage system to the database application hosted on the server.

13. The method of claim 11, wherein in the event the determined amount of time is not less than the downtime threshold, the data associated with the one or more changes made by the database application hosted on the server to the mounted database are migrated from the secondary storage system to the server while a user associated with the server has access to the mounted database.

14. The method of claim 1, wherein the server is part of the secondary storage system.

15. The method of claim 1, wherein the server is remote from the secondary storage system.

16. A non-transitory computer readable storage medium comprising computer instructions for:
receiving a request to migrate from a secondary storage system to a server a version of database content that was backed up to the secondary storage system from a primary system;
mounting a database based on the data associated with a cloned view associated with the version of the database content;
maintaining functionality of the database including by allowing a database application hosted on the server to access the mounted database while migrating the requested version of the database content from the secondary storage system to the server, wherein maintaining functionality of the database further comprises:
modifying the cloned view associated with the version of the database content based on one or more changes made by the database application hosted on the server to the mounted database while a migration instance is being performed;
receiving an indication that the migration instance is completed;
determining an amount of time to migrate from the secondary storage system to the server the data associated with the one or more changes made by the database application hosted on the server to the mounted database; and
finishing a migration of the one or more changes made to the mounted database to the server based on whether the determined amount of time is less than a downtime threshold, wherein finishing the migration of the one or more changes made to the mounted database to the server includes the database application hosted on the server being quiesced and migrating the data associated with the one or more changes made to the mounted database from the secondary storage system to the server after the database application has been quiesced.

17. The non-transitory computer readable storage medium of claim 16, wherein migrating the requested version of database content from the secondary storage system to the server includes migrating a subset of the data included in the mounted database.

18. The non-transitory computer readable storage medium of claim 16, wherein migrating the requested version of database content from the secondary storage system to the server includes migrating an entire set of the data included in the mounted database.

19. The non-transitory computer readable storage medium of claim 16, further comprising instructions for modifying data included in the mounted database based on one or more commands received from the server.

20. A system, comprising:
a processor; and
a memory coupled with the processor, wherein the memory is configured to provide the processor with instructions which when executed cause the processor to:
receive a request to migrate from a secondary storage system to a server a version of database content that was backed up to the secondary storage system from a primary system;
mount a database based on the data associated with a cloned view associated with the version of the database content;
maintain functionality of the database including by allowing a database application hosted on the server to access the mounted database while migrating the requested version of the database content from the secondary storage system to the server, wherein to maintain functionality of the database, the instructions cause the processor to:
modify the cloned view associated with the version of the database content based on one or more changes made to the mounted database while a migration instance is being performed;
receive an indication that the migration instance is completed;
determine an amount of time to migrate from the secondary storage system to the server the data associated with the one or more changes made to the mounted database; and
finish a migration of the one or more changes made to the mounted database to the server based on whether the determined amount of time is less than a downtime threshold, wherein to finish the migration of the one or more changes made to the mounted database to the server, the database application hosted on the server being quiesced and the processor is configured to migrate the data associated with the one or more changes made to the mounted database from the secondary storage system to the server after the database application has been quiesced.

* * * * *